(12) United States Patent
Lu et al.

(10) Patent No.: US 11,275,869 B2
(45) Date of Patent: Mar. 15, 2022

(54) CREDIT CARD AND OPERATING METHOD THEREFOR

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 108 days.

(21) Appl. No.: 16/628,726

(22) PCT Filed: Nov. 28, 2018

(86) PCT No.: PCT/CN2018/117819
§ 371 (c)(1),
(2) Date: Jan. 6, 2020

(87) PCT Pub. No.: WO2019/128602
PCT Pub. Date: Jul. 4, 2019

(65) Prior Publication Data
US 2020/0327257 A1 Oct. 15, 2020

(30) Foreign Application Priority Data
Dec. 29, 2017 (CN) .......................... 201711482646.8

(51) Int. Cl.
*G06F 21/77* (2013.01)
*G06F 21/60* (2013.01)
(Continued)

(52) U.S. Cl.
CPC ............ *G06F 21/77* (2013.01); *G06F 21/602* (2013.01); *G06F 21/6245* (2013.01);
(Continued)

(58) Field of Classification Search
CPC .... G06F 21/77; G06F 21/602; G06F 21/6245; G06F 21/31; G06Q 20/341;
(Continued)

(56) References Cited

U.S. PATENT DOCUMENTS 6,246,769 B1 * 6/2001 Kohut .................. G06Q 20/341
380/45
8,365,988 B1 * 2/2013 Medina, III ......... G06Q 20/322
235/380
(Continued)

FOREIGN PATENT DOCUMENTS

CN 104506319 A * 4/2015 ............. G06F 21/34
CN 106934606 A * 7/2017
(Continued)

*Primary Examiner* — Shahriar Zarrineh
(74) *Attorney, Agent, or Firm* — Hammer & Associates, P.C.

(57) ABSTRACT

An operating method for a credit card, the method comprising: step S1, a microprocessor is powered on to perform system initialization; step S2, the microprocessor hibernates and is awakened when a preset interruption is detected so as to execute step S3; and step S3, the microprocessor executes preset interruption processing by entering a preset interruption processing flow, and exits the preset interruption processing flow when the preset interruption processing is finished, then returns to step S2. Alternatively, the method comprises: step s1, the microprocessor is powered on to perform system initialization; step s2, the microprocessor checks whether a preset interruption marker is set, and if so, the preset interruption marker is reset so as to execute the preset interruption processing, otherwise the microprocessor executes step s3; and step s3, the microprocessor hibernates, is awakened when detecting the preset interruption so as to set the preset interruption marker, and then returns to step s2. The present invention may reduce the risk of credit card fraud.

20 Claims, 4 Drawing Sheets

(51) Int. Cl.
*G06F 21/62* (2013.01)
*G06Q 20/34* (2012.01)
*G06Q 20/40* (2012.01)
*H04L 9/06* (2006.01)

(52) U.S. Cl.
CPC ......... *G06Q 20/341* (2013.01); *G06Q 20/355* (2013.01); *G06Q 20/4018* (2013.01); *H04L 9/0618* (2013.01)

(58) Field of Classification Search
CPC ............. G06Q 20/355; G06Q 20/4018; G06Q 20/3563; H04L 9/0618; H04L 9/0891; H04L 9/3228; H04L 9/065; H04L 9/06; G07F 7/0826; G07F 7/0846
See application file for complete search history.

(56) References Cited

U.S. PATENT DOCUMENTS

| | | | |
|---|---|---|---|
| 10,299,118 B1 * | 5/2019 | Karachiwala | ........... H04L 67/26 |
| 2016/0217471 A1 | 7/2016 | Ashfield | |
| 2019/0164166 A1 * | 5/2019 | Kinch | ................ G06Q 20/3823 |
| 2019/0180272 A1 * | 6/2019 | Douglas | ............... G06Q 20/202 |

FOREIGN PATENT DOCUMENTS

| | | | | |
|---|---|---|---|---|
| CN | 108134667 A | * | 6/2018 | ......... G06Q 20/4012 |
| CN | 108234110 B | * | 7/2019 | ........... G06Q 20/355 |
| FR | 2771533 A1 | * | 5/1999 | ....... G06K 19/07786 |
| WO | WO-0241207 A1 | * | 5/2002 | ............... G07F 7/08 |
| WO | WO-2015166913 A1 | * | 11/2015 | ............. H04L 63/08 |

\* cited by examiner

CREDIT CARD AND OPERATING METHOD THEREFOR

FIELD OF THE INVENTION

The present invention relates to a credit card and a working method thereof, which belongs to information security field.

BACKGROUND OF THE INVENTION

Credit card is one of the fastest developing financial businesses nowadays. The credit card can work as an electric currency which replaces traditional cash within a certain scope. Credit card security code is a security code for a credit card in a process of transaction on the network or telephone, which is for proving that payer is the card holder while performing the transaction. In such way credit card fraud is avoided. However, a password is not require while shopping on a website broad and transaction can be completed by providing an account number and a security code of a credit card by the user. A domestic seller may sign a contract with a bank, transaction via telephone can be performed by providing the security code of the credit card without a password of the credit card. Because the security code of the credit card usually is a fixed number with three or four digits, which is printed on the credit card, the credit card is easily to be remembered by other people in process of using and is used illegally.

SUMMARY OF THE INVENTION

The purpose of the present invention is to provide a credit card and a working method thereof, which can reduce risk of leaking security code of the credit card and identity theft.

Therefore, according to one aspect of the present invention, the present invention provides a working method of a credit card, in which a built-in micro-processor executes the following steps:

Step S1, powering up the micro-processor and performing, by the micro-processor, system initializing;

Step S2, sleeping of the micro-processor and being waken up when the micro-processor detects a preset interruption, going to Step S3; and Step S3, entering, by the micro-processor, a preset interruption processing process to perform interruption processing, exiting interruption processing process when the interruption processing is completed, then going back to Step S2;

the preset interruption processing process includes:

Step a1, obtaining a dynamic security code factor, generating bit torrent according to the dynamic security code factor and card personalized data in a card; dividing the bit torrent into a first data chunk and a second data chunk;

Step a2, taking the first data chunk as data to be encrypted, encrypting the data to be encrypted to obtain a first data chunk ciphertext;

Step a3, performing exclusive OR operation on the first data chunk ciphertext and a second data chunk to obtain a third data chunk;

Step a4, taking the third data chunk as data to be encrypted, encrypting the data to be encrypted to obtain a third data chunk ciphertext;

Step a5, taking the third data chunk ciphertext as data to be decrypted, decrypting the data to be decrypted to obtain a fourth data chunk, taking the fourth data chunk as data to be encrypted, encrypting the data to the encrypted to obtain a fourth data chunk ciphertext; and Step a6, extracting, converting and sorting the fourth data chunk ciphertext, taking a preset part of processing result as a current valid credit card security code and displaying current valid credit card security code.

Or, there is provided a working method of the credit card, in which a built-in micro-processor executes the following steps:

Step s1, powering up the micro-processor and performing, by the micro-processor, system initializing;

Step s2, determining, by the micro-processor, whether a preset interruption flag is set, if yes, resetting the preset interruption flag and executing the preset interrupt processing; otherwise, executing Step s3; and Step s3, sleeping of the micro-processor, being waken up when the micro-processor detects a preset interruption, entering the preset interruption processing process and resetting the preset interruption flag, exiting the preset interruption processing process, going back to Step s2;

the preset interruption processing includes:

Step s2-1, obtaining a dynamic security code factor, generating bit torrent according to the dynamic security code factor and card personalized data in a card; dividing the bit torrent into a first data chunk and a second data chunk;

Step s2-2, taking the first data chunk as data to be encrypted, encrypting the data to be encrypted to obtain a first data chunk ciphertext;

Step s2-3, performing exclusive OR operation on the first data chunk ciphertext and a second data chunk to obtain a third data chunk;

Step s2-4, taking the third data chunk as data to be encrypted, encrypting the data to be encrypted to obtain a third data chunk ciphertext;

Step s2-5, taking the third data chunk ciphertext as data to be decrypted, decrypting the data to be decrypted to obtain a fourth data chunk, taking the fourth data chunk as data to be encrypted, encrypting the data to the encrypted to obtain a fourth data chunk ciphertext; and Step s2-6, extracting, converting and sorting the fourth data chunk ciphertext, and taking a preset part of processing result as a current valid credit card security code and displaying current valid credit card security code.

According to another aspect of the present invention, a credit card is provided. The credit card has a built-in micro-processor; and the micro-processor includes:

a powering up module configured for the micro-processor to power up;

an initializing module configured to perform system initializing after the micro-processor powers up;

a sleeping module configured for the micro-processor to sleep after initializing; and sleep after the micro-processor exits the present interruption processing process;

a detecting module configured to detect a preset interruption when the micro-processor sleeps;

a waking up module configured for the micro-processor to be waken up after detecting the preset interruption; and an interruption processing module configured for the micro-processor to enter a preset interruption processing process after being waken up and perform preset interruption processing; and exit the preset interruption processing process when the preset interruption processing is completed;

the interruption processing module specifically includes:

an obtaining unit configured to obtain a dynamic security code factor;

a storing unit configured to store card personalized data;

a generating unit configured to generate bit torrent according to the dynamic security code factor obtained by the obtaining unit and card personalized data stored in the storing unit;

a dividing unit configured to divide the bit torrent generated by the generating unit into a first data chunk and a second data chunk;

an encrypting unit configured to take the first data chunk as data to be encrypted, encrypting the data to be encrypted to obtain a first data chunk ciphertext; further configured to take the third data chunk obtained by the exclusive OR operation performing unit as data to be encrypted, encrypting the data to be encrypted to obtain a third data chunk ciphertext; further configured to take the fourth data chunk obtained by the decrypting unit as data to be encrypted, encrypting the data to the encrypted to obtain a fourth data chunk ciphertext;

an exclusive OR operation performing unit configured to perform exclusive OR operation on the first data chunk ciphertext obtained by the encrypting unit and a second data chunk obtained by the dividing unit to obtain a third data chunk;

a decrypting unit configured to take the third data chunk ciphertext obtained by the encrypting unit as data to be decrypted, decrypt the data to be decrypted to obtain a fourth data chunk;

a processing unit configured to extract, convert and sort the fourth data chunk ciphertext obtained by the encrypting unit, take a preset part of processing result as a current valid credit card security code; and a displaying unit configured to control and display the current valid credit card security code.

Or, there is provided a micro-processor which includes:

a powering up module configured for the micro-processor to power up;

an initializing module configured to perform system initializing after the micro-processor powers up;

a checking module configured to check whether a preset interrupt flag is set after the micro-processor performs system initializing; to check whether the preset interrupt flag is set after the micro-processor exits interruption processing process;

an interruption processing module configured to reset preset interruption flag upon detecting that the preset interruption flag is set and perform preset interruption processing;

a sleeping module configured to sleep when the micro-processor checks that no interruption flag is set;

a detecting module is configured to detect preset interruption when the micro-processor sleeps; and a waking up module configured to enter a preset interruption processing process and set a preset interruption flag when the micro-processor is waken up upon detecting the preset interruption and detect preset interruption processing process;

the interruption processing module specifically comprises:

an obtaining unit configured to obtain a dynamic security code factor;

a storing unit configured to store card personalized data;

a generating unit configured to generate bit torrent according to the dynamic security code factor obtained by the obtaining unit and card personalized data in the storing unit;

a dividing unit configured to divide the bit torrent generated by the generating unit into a first data chunk and a second data chunk;

an encrypting unit configured to take the first data chunk as data to be encrypted, encrypting the data to be encrypted to obtain a first data chunk ciphertext; take the third data chunk obtained by the exclusive OR operation performing unit as data to be encrypted, encrypting the data to be encrypted to obtain a third data chunk ciphertext; and take the fourth data chunk obtained by the decrypting unit as data to be encrypted, encrypting the data to the encrypted to obtain a fourth data chunk ciphertext;

an exclusive OR operation performing unit configured to perform exclusive OR operation on the first data chunk ciphertext obtained by the encrypting unit and a second data chunk obtained by the dividing unit to obtain a third data chunk;

a decrypting unit configured to take the third data chunk ciphertext obtained by the encrypting unit as data to be decrypted, decrypt the data to be decrypted to obtain a fourth data chunk;

a processing unit configured to extract, convert and sort the fourth data chunk ciphertext obtained by the encrypting unit, take a preset part of processing result as a current valid credit card security code; and a displaying unit configured to control and display the current valid credit card security code.

According to the present invention, the credit card security code is generated according to a secure cipher algorithm and dynamically changed. In process of using the credit card security code, even if a current valid credit card security code is remembered by anyone else, it is hard to swipe the credit card unlawfully according to the stolen current valid credit card security code, which reduces a risk of illegal using a credit card resulted from leaking the credit card security code.

DETAILED DESCRIPTION

Figure 1:
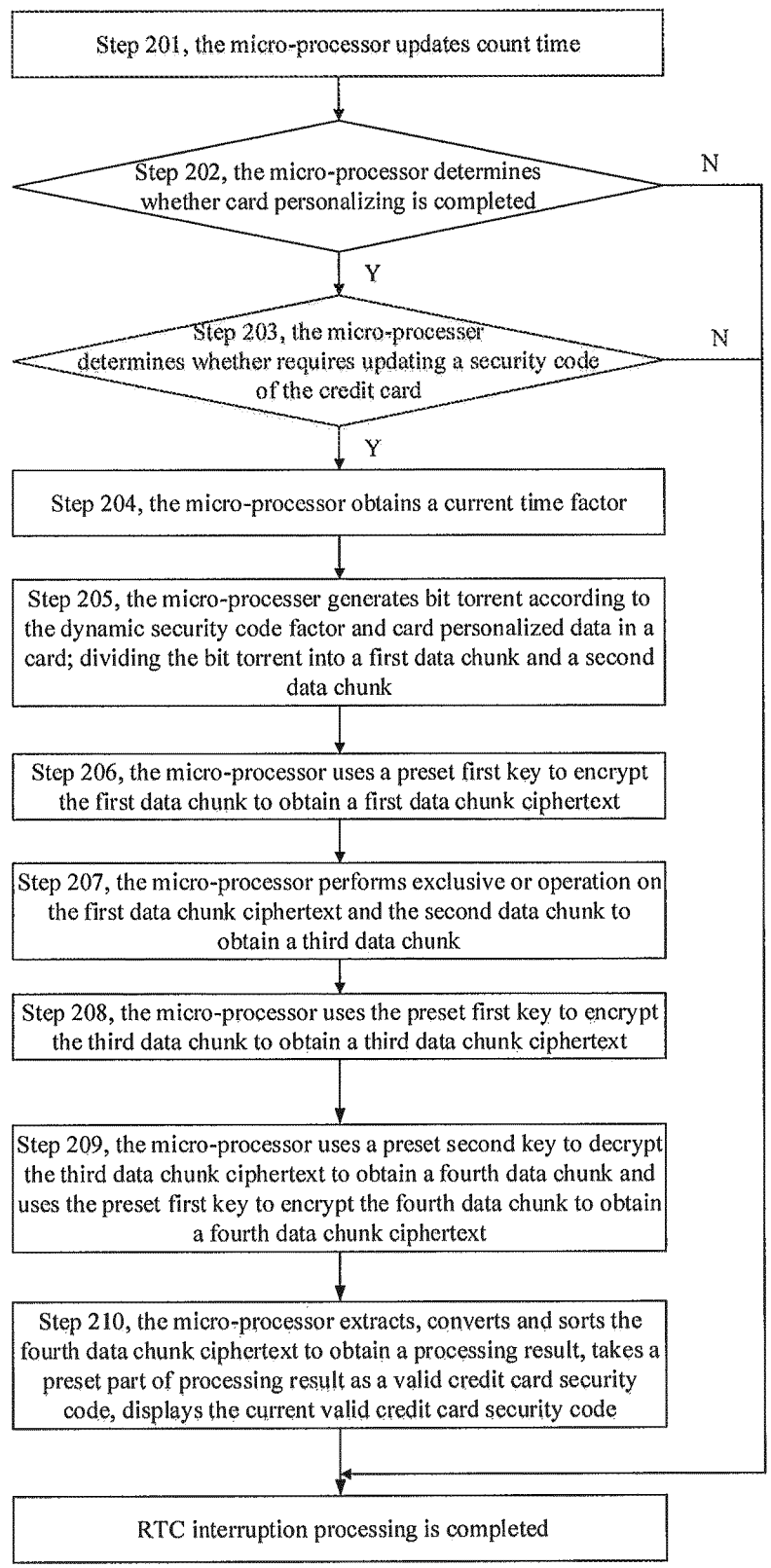
FIG. 1 is a flow chart of RTC interruption processing according to Embodiment 2 of the present invention.

The technical solutions of the embodiments of the disclosure are described clearly and completely in conjunction with the accompanying drawings as follows. Apparently, the described embodiments are merely a part but not all of the embodiments according to the disclosure. Based on the described embodiments of the disclosure, other embodiments obtained by those skilled in the art without any creative work belong to the scope of the disclosure.

Embodiment 1

Embodiment 1 provides a working method of a credit card. The credit card includes a micro-processor and a power supply circuit, a displaying circuit and a communicating circuit.

The working method of the credit card includes:

Step S1, the micro-processer powers up and performs system initializing;

Step S2, the micro-processer sleeps; when the micro-processer detects a preset interruption, the micro-processer is waken up and execute Step S3; and Step S3, the micro-processer enters a preset interruption processing process and performs preset interruption processing; when the preset interruption processing is completed, the micro-processor exits the preset interruption processing process and go back to Step S2.

The preset interruption processing includes:

Step a1, obtaining a dynamic security code factor, generating bit torrent according to the dynamic security code factor and card personalized data in a card; dividing the bit torrent into a first data chunk and a second data chunk;

Step a2, taking the first data chunk as data to be encrypted, encrypting the data to be encrypted to obtain a first data chunk ciphertext;

Step a3, performing exclusive OR operation on the first data chunk ciphertext and a second data chunk to obtain a third data chunk;

Step a4, taking the third data chunk as data to be encrypted, encrypting the data to be encrypted to obtain a third data chunk ciphertext;

Step a5, taking the third data chunk ciphertext as data to be decrypted, decrypting the data to be decrypted to obtain a fourth data chunk, taking the fourth data chunk as data to be encrypted, encrypting the data to the encrypted to obtain a fourth data chunk ciphertext; and Step a6, extracting, converting and sorting the fourth data chunk ciphertext, and taking a preset part of processing result as a current valid credit card security code and displaying current valid credit card security code.

Embodiment 2

Embodiment 2 provides a working method of a credit card, the credit card includes a micro-processor and a power supply circuit, a displaying circuit and a communicating circuit.

The working method of the credit card includes:

Step 101, the micro-processor powers up and performs system initializing.

In Embodiment 2, the micro-processor is powered up by power supply circuit; performing system initializing includes initializing system hardware and initializing system variable; and the hardware includes IO interface and display screen, etc.

Step 102, the micro-processer sleeps, when the micro-processer detects a preset interruption, the micro-processer is waken up and execute Step 103.

Step 103, the micro-processer enters interruption processing process and performs interruption processing, when the interruption processing is completed, the micro-processor exits interruption processing process and go back to Step 102.

In Embodiment 2, the interruption specifically includes communication interruption and RTC interruption:

When the micro-processor detects communication interruption, the micro-processor is waken up and enters an interruption processing process and performs interruption processing; when the communication interruption is completed, the micro-processor exits the communication interruption processing process;

Specifically, the communication interruption processing includes that the micro-processor receives communication data and personalizes the card according to the received communication data; further, personalizing the card according to the received communication data includes that writing card personalized data and a preset key into the card according to the received communication data; in this case, the personalized data includes, but not limited to, a main account, an expiration date of card and a service code sequence; and the preset key includes, but not limited to, a first preset key and a second preset key.

When the micro-processor detects RTC interruption, the micro-processor is waken up and enters RTC interruption processing process to perform RTC interruption processing; when the RTC interruption processing is completed, the micro-processor exits RTC interruption processing process;

Specifically, as shown in FIG. 1, the RTC interruption processing includes:

Step 201, the micro-processor updates counting time;

Step 202, the micro-processor determines whether card personalizing is completed, if yes, execute Step 203; otherwise, RTC interruption processing is completed;

Further, when the micro-processor determines that card personalizing is not completed, the micro-processor can display corresponding prompting information. In Embodiment 2, the micro-processor displays corresponding information via displaying circuit.

Step 203, the micro-processor determines whether requires updating a security code of the credit card, if yes, execute Step 204; otherwise, RTC interruption processing is completed;

Specifically, the micro-processor determines whether counting time is an integral multiple of a preset time period of dynamic security code, if yes, the security code of the credit card is required to be updated; otherwise, the security code of the credit card is not required to be updated;

For example, the preset time period of the dynamic security code is 60 seconds.

Step 204, the micro-processor obtains a current time factor.

In Embodiment 2, the micro-processor obtains a current counting time, computes a difference in unit of second between the current counting time and a universal coordinated time, divides the difference by a preset time window value to obtain a result, takes integral part of the result; if the integral part of the result has not reach 8 digits, add 0 to the left side of the integral part of the result to make a 8-digit value which is used as time factor; if the integral part of the result has more than 8 digits, intercept 8 digits of the left side of the integral part to make a 8-digit value which is used as a current time factor.

For example, the universal coordinated time is 0:00:00, Jan. 1, 1970; the preset time window value is 28800; the current counting time intercepted by the micro-processor is 3:24:58, Jul. 28, 2017; a difference in unit of second between the current counting time and a universal coordinated time is obtained by computing is 1501212298; the obtained difference is divided by a preset time window value to obtain a result, the integral part of the result is taken to obtain 52125; it can be seen that the integral part of the result is less than 8 digits, 0 is added to the left side of the integral part of the result to obtain a value of 8 digits, the value of 8 digits is the current time factor 00052125.

Step 205, the micro-processer generates bit torrent according to the dynamic security code factor and card personalized data in a card; dividing the bit torrent into a first data chunk and a second data chunk.

In Embodiment 2, the card personalized data, which is stored in the card, includes, but not limited to, a main account, an expiration date of card and a service code sequence;

Specifically, the micro-processor replaces data of the first preset length in the main account with the current time factor to obtain a changed main account, connects the changed main account and the service code sequence orderly to obtain a connecting data, adding preset data to the right side of the connecting data to obtain the bit torrent with a second preset length.

For example, the main account is 4123456789012345, the expiration date of card is 1704, the service code sequence is 888 and the current time factor is 00052125; the micro-processor replaces the first 8 digits of the main account with the current time factor to obtain a changed main account 0005212589012345; the changed main account and the service code sequence are connected orderly to obtain connecting data 00052125890123451704888; 0 is added to the right side of the connecting data to obtain bit torrent with length of 128 bits, i.e. 00052125890123451704888000000000.

Specifically, the micro-processor divides the bit-torrent evenly, the first 64 bits of the bit torrent is the first data chunk, the last 64 bits of the bit torrent is the second data chunk.

For example, the bit torrent is 00052125890123451704888000000000; the first data chunk obtained by dividing is 0005212589012345; the second data chunk obtained by dividing is 1704888000000000.

Step 206, the micro-processor uses a preset first key to encrypt the first data chunk to obtain a first data chunk ciphertext.

In Embodiment 2, the micro-processor uses the first preset key to encrypt the first data chunk.

For example, the first key is 1122334455667788; the first data chunk is 0005212589012345; and the micro-processor uses the preset first key to encrypt the first data chunk to obtain a first data chunk ciphertext 75C5587D133E88C7.

Step 207, the micro-processor performs exclusive OR operation on the first data chunk ciphertext and the second data chunk to obtain a third data chunk.

For example, the first data chunk ciphertext is 75C5587D133E88C7, the second data chunk is 1704888000000000; the micro-processor performs exclusive OR operation on the first data chunk ciphertext and the second data block to obtain a third data chunk 62C1D0FD133E88C7.

Step 208, the micro-processor uses the preset first key to encrypt the third data chunk to obtain a third data chunk ciphertext.

For example, the first key is 1122334455667788, the third data block is 62C1D0FD133E88C7; the micro-processor uses the preset first key to encrypt the third data chunk to obtain the third data chunk ciphertext D2FF50C34545B875.

Step 209, the micro-processor uses a preset second key to decrypt the third data chunk ciphertext to obtain a fourth data chunk and uses the preset first key to encrypt the fourth data chunk to obtain a fourth data chunk ciphertext.

For example, the first key is 1122334455667788; the second key is 8877665544332211; the third data chunk ciphertext is D2FF50C34545B875; the micro-processor uses the second preset key to decrypt the third data chunk ciphertext to obtain a fourth data chunk 600F6151E9AB608D and uses the preset first key to encrypt the fourth data chunk to obtain a fourth data chunk ciphertext 54476FDF143C0B58.

Step 210, the micro-processor extracts, converts and sorts the fourth data chunk ciphertext to obtain a processing result, takes a preset part of processing result as a valid credit card security code, displays the current valid credit card security code and RTC interruption processing is completed.

In Embodiment 2, the micro-processor displays the current valid credit card security code via display circuit.

In Embodiment 2, that the micro-processor extracts, converts and sorts the fourth data chunk ciphertext to obtain a processing result, takes a preset part of processing result as a valid credit card security code specifically includes:

Step 210-1, the micro-processor extracts all numbers between the first data and the second data in the fourth chunk data chunk ciphertext from the beginning of the left side of the fourth data chunk ciphertext to obtain a first extracting data; the micro-processor extracts all numbers between the third data and the fourth data in the fourth chunk data chunk ciphertext from the beginning of the left side of the fourth data chunk ciphertext to obtain a second extracting data.

Step 210-2, the micro-processor replaces each number in the second extracting data with its corresponding difference of the number and the fifth data to obtain a converted second extracting data.

Step 210-3, the micro-processor connects the first extracting data and the converted second extracting data orderly to obtain a processing result.

Step 210-4, the micro-processor intercepts a first three number of the processing result and takes the first three number as the current valid credit card security code.

For example, the fourth data chunk ciphertext is 54476FDF143C0B58; the micro-processor extracts the number between 0 and 9 from the left side of the fourth data chunk ciphertext to obtain the first extracting data 54476143058; extracts the number between A and F in the fourth data chunk ciphertext from the left side of the fourth data chunk ciphertext to obtain the second extracting data FDFCB; replaces each data in the second extracting data with its corresponding difference between the number and 10 to obtain the converted second extracting data 53521; connects the first extracting data and the converted second extracting data orderly to obtain the processing result 5447614305853521; and the micro-processor intercepts the first 3 number 544 as the current valid credit card security code.

Embodiment 3

Embodiment 3 provides a working method of credit card, the credit card includes a micro-processor and a power supply circuit, a displaying circuit and a communicating circuit.

The working method of the credit card includes:

Step 101, the micro-processor powers up and performs system initializing.

In Embodiment 3, the micro-processor is powered up by power supply circuit; performing system initializing includes initializing system hardware and initializing system variable; and the hardware includes IO interface and display screen, etc.

Step 102, the micro-processor sleeps, when the micro-processor detects a preset interruption, the micro-processer is waken up and execute Step 103.

Step 103, the micro-processor enters interruption processing process and performs interruption processing, when the interruption processing is completed, the micro-processor exits interruption processing process and go back to Step 102.

In Embodiment 3, the interruption specifically includes communication interruption, RTC interruption, and key interruption:

When the micro-processor detects communication interruption, the micro-processor is waken up and enters a interruption processing process and performs interruption processing; when the communication interruption is completed, the micro-processor exits the communication interruption processing process.

Specifically, the communication interruption processing includes that the micro-processor receives communication data and personalizes the card according to the received communication data; further, personalizing the card according to the received communication data includes that writing card personalized data and a preset key into the card according to the received communication data; in this case, the personalized data includes, but not limited to, a main account, an expiration date of card and a service code sequence; the preset key includes, but not limited to, a first preset key and a second preset key.

when the micro-processor detects RTC interruption, the micro-processor is waken up and enters RTC interruption processing process to perform RTC interruption processing; when the RTC interruption processing is completed, the micro-processor exits RTC interruption processing process;

Specifically, the RTC interruption processing includes: the micro-processor updates counting time.

When the micro-processor detects key interruption, the micro-processor is waken up, enters key interruption processing process and executes key interruption processing; the micro-processor exits key interruption processing process when the key interruption processing is completed.

Figure 2:
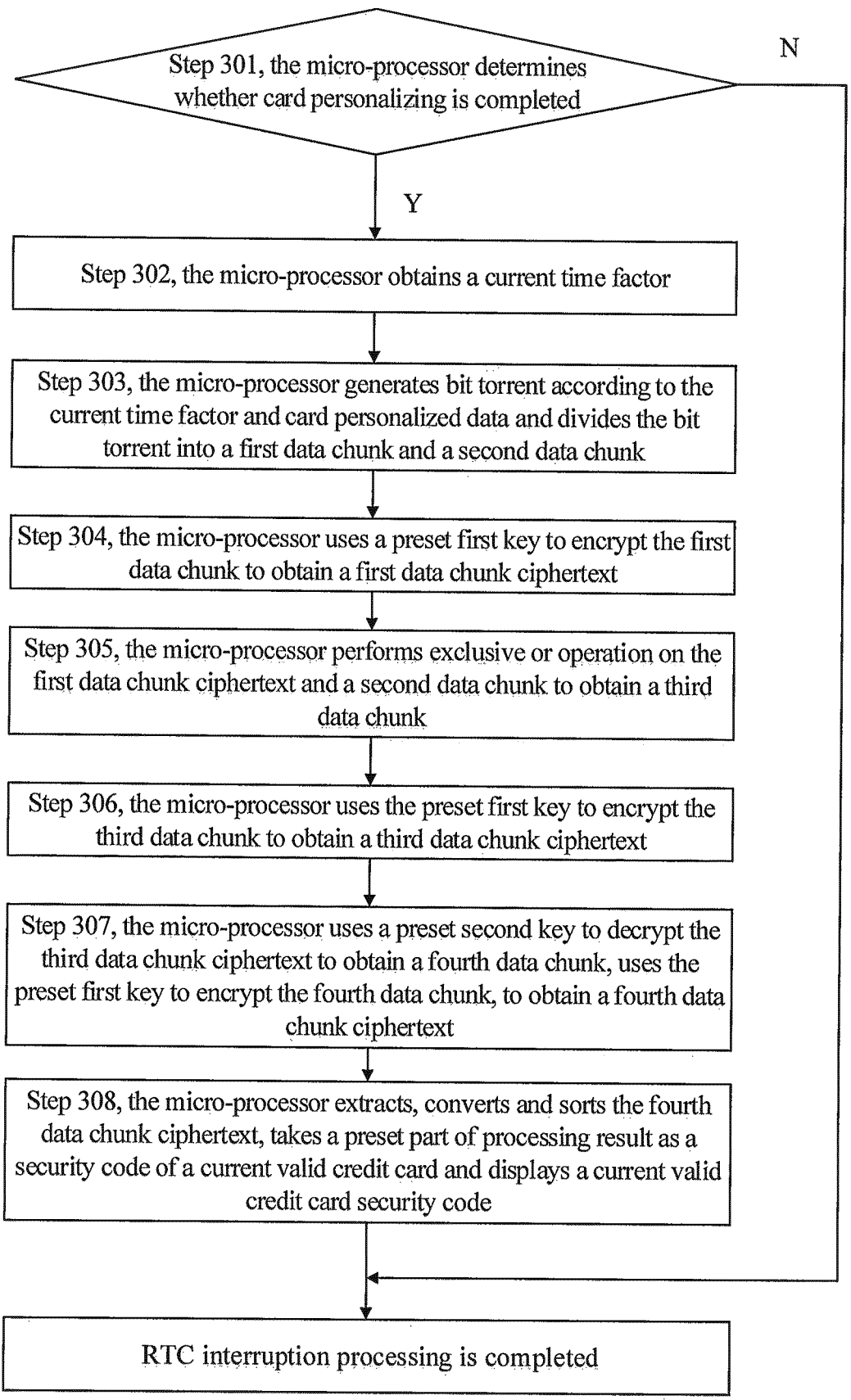
FIG. 2 is a flow chart of key pressing interruption processing according to Embodiment 3 of the present invention.

Specifically, as shown in FIG. 2, the key interruption processing includes:

Step 301, the micro-processor determines whether card personalizing is completed, if yes, execute Step 302; otherwise key interruption processing is completed.

Further, if the micro-processor determines that card personalizing is not completed, the micro-processor can display corresponding prompting information. In Embodiment 3, the micro-processor displays corresponding prompting information via display circuit.

Step 302, the micro-processor obtains a current time factor.

Step 303, the micro-processor generates bit torrent according to the current time factor and card personalized data and divides the bit torrent into a first data chunk and a second data chunk.

Step 304, the micro-processor uses a preset first key to encrypt the first data chunk to obtain a first data chunk ciphertext.

Step 305, the micro-processor performs exclusive OR operation on the first data chunk ciphertext and a second data chunk to obtain a third data chunk.

Step 306, the micro-processor uses the preset first key to encrypt the third data chunk to obtain a third data chunk ciphertext.

Step 307, the micro-processor uses a preset second key to decrypt the third data chunk ciphertext to obtain a fourth data chunk, uses the preset first key to encrypt the fourth data chunk, to obtain a fourth data chunk ciphertext.

Step 308, the micro-processor extracts, converts and sorts the fourth data chunk ciphertext, takes a preset part of processing result as a security code of a current valid credit card and displays a current valid credit card security code; the key interruption processing is completed.

In Embodiment 3, the micro-processor displays the current valid credit card security code via the display circuit.

In Embodiment 3, implementing of Steps 302-308 can refer to Steps 204-210 in Embodiment 2. No more details is given here.

Embodiment 4

Embodiment 4 provides a working method of a credit card, the credit card includes a micro-processor and a power supply circuit, a displaying circuit and a communicating circuit.

The working method of the credit card includes:

Step 101, the micro-processor powers up and performs system initializing.

In Embodiment 4, the micro-processor is powered up by power supply circuit; performing system initializing includes initializing system hardware and initializing system variable; the hardware includes IO interface and display screen, etc.

Step 102, the micro-processor sleeps, when the micro-processer detects a preset interruption, the micro-processer is waken up and execute Step 103.

Step 103, the micro-processor enters interruption processing process and performs interruption processing, when the interruption processing is completed, the micro-processor exits interruption processing process and go back to Step 102.

In Embodiment 4, the interruption specifically includes communication interruption and RTC interruption:

When the micro-processor detects communication interruption, the micro-processor is waken up and enters a interruption processing process and performs interruption processing; when the communication interruption is completed, the micro-processor exits the communication interruption processing process;

Specifically, the communication interruption processing includes that the micro-processor receives communication data and personalizes the card according to the received communication data; further, personalizing the card according to the received communication data includes that writing card personalized data and a preset key pressing times into the card according to the received communication data; in this case, the personalized data includes, but not limited to, a main account, an expiration date of card and a service code sequence; the preset key includes, but not limited to, a first preset key and a second preset key.

When the micro-processor detects communication interruption, the micro-processor is waken up and enters an interruption processing process and performs interruption processing; when the communication interruption is completed, the micro-processor exits the communication interruption processing process.

Figure 3:
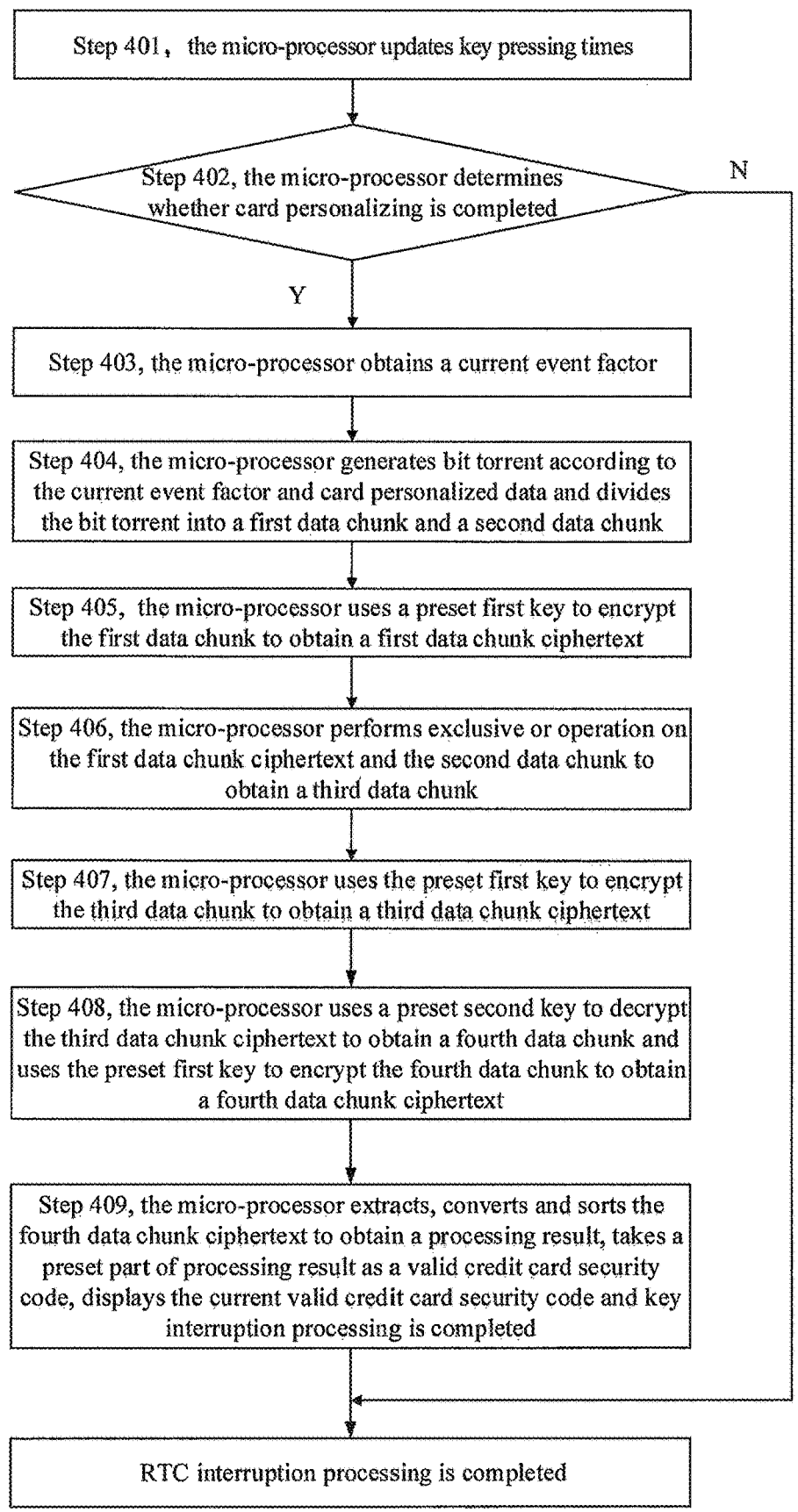
FIG. 3 is a flow chart of key pressing interruption processing according to Embodiment 4 of the present invention.

Specifically, as shown in FIG. 3, the key interruption processing includes:

Step 401, the micro-processor updates key pressing times.

Step 402, the micro-processor determines whether card personalizing is completed, if yes, execute Step 403; otherwise, key interruption processing is completed;

Further, when the micro-processor determines that card personalizing is not completed, the micro-processor can display corresponding prompting information; in Embodiment 4, the micro-process displays corresponding prompting information via the displaying circuit.

Step 403, the micro-processor obtains a current event factor;

In Embodiment 4, the micro-processor obtains a current key pressing times, if the current key pressing times is less than 8 numbers, add 0 from the left side of the current key pressing times to obtain 8 numbers which is the current event factor; if the current key pressing times is 8 numbers or more than 8 numbers, the current key pressing times is taken as the current event factor.

Step 404, the micro-processor generates bit torrent according to the current event factor and card personalized data and divides the bit torrent into a first data chunk and a second data chunk.

In Embodiment 4, the card personalized data, which is stored in the card, includes, but not limited to, a main account, an expiration date of card and a service code sequence;

Specifically, the micro-processor replaces the current event factor to replaces the first 8 digits of the main account with the current event factor to obtain a changed main account, connects the changed main account to the service code sequence orderly to obtain connecting data and adds 0 from the right side of the connecting data to obtain bit torrent with length of 128 bits.

For example, the main account is 4123456789012345, the expiration date of card is 1704, the service code sequence is 888 and the current event factor is 00052125; the micro-processor replaces the first 8 digits of the main account with the current event factor to obtain a changed main account 0005212589012345; the changed main account and the service code sequence are connected orderly to obtain connecting data 0005212589012345 1704888; 0 is added to the right side of the connecting data to obtain bit torrent with length of 128 bits, i.e. 00052125890123451704888000000000.

Specifically, the micro-processor divides the bit-torrent evenly, the first 64 bits of the bit torrent is the first data chunk, the last 64 bits of the bit torrent is the second data chunk.

For example, the bit torrent is 00052125890123451704888000000000; the first data chunk obtained by dividing is 0005212589012345; the second data chunk obtained by dividing is 1704888000000000.

Step 405, the micro-processor uses a preset first key to encrypt the first data chunk to obtain a first data chunk ciphertext.

Step 406, the micro-processor performs exclusive OR operation on the first data chunk ciphertext and the second data chunk to obtain a third data chunk.

Step 407, the micro-processor uses the preset first key to encrypt the third data chunk to obtain a third data chunk ciphertext.

Step 408, the micro-processor uses a preset second key to decrypt the third data chunk ciphertext to obtain a fourth data chunk and uses the preset first key to encrypt the fourth data chunk to obtain a fourth data chunk ciphertext.

Step 409, the micro-processor extracts, converts and sorts the fourth data chunk ciphertext to obtain a processing result, takes a preset part of processing result as a valid credit card security code, displays the current valid credit card security code and key interruption processing is completed.

In Embodiment 4, the micro-processor displays a current valid credit card security code via display circuit.

In Embodiment 4, implementing of Steps 405-409 can refer to Steps 206-210 in Embodiment 2. No more details is given here.

In present invention, updating counting time can specifically is adding 1 second to a current value of current counting time; updating key pressing times can specifically is adding 1 to a current value of key pressing times.

Embodiment 5

Embodiment 5 provides a working method of a credit card. The credit card includes a micro-processor and a power supply circuit, a displaying circuit and a communicating circuit.

The working method of the credit card includes:

Step s1, the micro-processor powers up and performs system initializing;

Step s2, the micro-processor checks whether a preset interrupt flag is set, if yes, reset the preset interrupt flag and execute preset interruption processing; otherwise, execute Step s3; and Step s3, the micro-processor sleeps; when the micro-processor detects a preset interruption, the micro-processer is waken up, enters a preset interruption processing process and sets the interrupt flag, and exits the preset interruption processing process, then going back to Step s2.

The preset interruption processing includes:

Step s2-1, obtaining a dynamic security code factor, generating bit torrent according to the dynamic security code factor and card personalized data in a card; dividing the bit torrent into a first data chunk and a second data chunk;

Step s2-2, taking the first data chunk as data to be encrypted, encrypting the data to be encrypted to obtain a first data chunk ciphertext;

Step s2-3, performing exclusive OR operation on the first data chunk ciphertext and a second data chunk to obtain a third data chunk;

Step s2-4, taking the third data chunk as data to be encrypted, encrypting the data to be encrypted to obtain a third data chunk ciphertext;

Step s2-5, taking the third data chunk ciphertext as data to be decrypted, decrypting the data to be encrypted to obtain a fourth data chunk, taking the fourth data chunk as data to be encrypted, encrypting the data to the encrypted to obtain a fourth data chunk ciphertext; and Step s2-6, extracting, converting and sorting the fourth data chunk ciphertext, taking a preset part of processing result as a current valid credit card security code, and displaying the current valid credit card security code.

Embodiment 6

Embodiment 6 provides a working method of a credit card, the credit card includes a micro-processor and a power supply circuit, a displaying circuit and a communicating circuit.

The working method of the credit card includes:

Step 501, the micro-processor powers up and performs system initializing.

In Embodiment 6, the micro-processor is powered up by power supply circuit; performing system initializing includes initializing system hardware and initializing system variable; the hardware includes IO interface and display screen, etc.

Step 502, the micro-processor checks whether a interrupt flag is set, if yes, reset the interrupt flag and execute interruption processing; otherwise, execute Step 503;

Step 1, the micro-processor checks whether the communicating interrupt flag is set, if yes, reset the communicating interrupt flag and execute Step 2; otherwise, execute Step 2;

Step 2, the micro-processor checks whether RTC interrupt flag is set, if yes, reset RTC interrupt flag and execute RTC interruption processing, execute Step 503; otherwise, execute Step 503;

In Embodiment 6, content included in the communicating interrupt processing and the RTC interrupt processing is identical to that of Embodiment 2; no more detail is given here.

Further, in Embodiment 6, the micro-processor can check whether RTC interrupt flag is set first and then check whether the communicating interrupt flag is set.

Step 503, the micro-processor sleeps; when the micro-processor detects interruption, the micro-processor is waken up and set the interrupt flag, go back to Step 502.

Specifically, in Embodiment 6, the micro-processor is waken up when the micro-processor detects communicating interruption or RTC interruption; In the case that the micro-processor is waken up upon detecting communicating interruption, the micro-processor enters communicating interruption processing process and sets the communicating interrupt flag, exits the communicating processing process; in the case that the micro-processor is waken up upon detecting RTC interruption, the micro-processor enters RTC interruption processing process and sets the RTC interrupt flag, and exists RTC interruption processing process.

In present invention, updating counting time can specifically is adding 1 second to a current value of current counting time; and updating key pressing times can specifically is adding 1 to a current value of key pressing times.

Embodiment 7

Embodiment 7 provides a working method of a credit card, the credit card includes a micro-processor and a power supply circuit, a displaying circuit and a communicating circuit.

The working method of the credit card includes:

Step 501, the micro-processor powers up and performs system initializing.

In Embodiment 7, the micro-processor is powered up by power supply circuit; performing system initializing includes initializing system hardware and initializing system variable; the hardware includes IOinterface and display screen, etc.

Step 502, the micro-processor checks whether interrupt flag is set, if yes, reset the interrupt flag and execute interruption processing, execute Step 503; otherwise, execute Step 503;

In Embodiment 7, the interruption includes communicating interruption, RTC interruption and key pressing interruption; preferably, Step 502 specifically includes:

Step 1, the micro-processor checks whether communicating interrupt flag is set, if yes, reset the communicating interrupt flag and execute communicating interruption processing, execute Step 2; otherwise, execute Step 2;

Step 2, the micro-processor checks whether a key pressing interrupt flag is set, if yes, reset the key pressing interrupt flag and execute Step 3; otherwise, execute Step 3;

Step 3, the micro-processor checks whether RTC interrupt flag is set, if yes, reset RTC interrupt flag and execute RTC interrupt processing, execute Step 503; otherwise, execute Step 503;

In Embodiment 7, content of the communicating interruption processing, RTC interruption processing and key pressing interruption processing is identical to that of Embodiment 3, no more detail is given here.

Further, in Embodiment 7, checking whether respective interruption flags are set in any else order; no more detail is given here.

Step 503, the micro-processor sleeps; when micro-processor is waken up upon detecting interruption and sets the interrupt flag; go back to Step 502.

Specifically, in Embodiment 7, the micro-processor is waken up when the micro-processor detects communicating interruption or RTC interruption; In the case that the micro-processor is waken up upon detecting communicating interruption, the micro-processor enters communicating interruption processing process and sets the communicating interrupt flag, exits the communicating processing process; in the case that the micro-processor is waken up upon detecting key pressing interruption, the micro-processor enters key pressing interruption processing process, sets the key pressing interrupt flag, exits the key pressing processing process; in the case that the micro-processor is waken up upon detecting RTC interruption, the micro-processor enters RTC interruption processing process and sets the RTC interrupt flag, exists RTC' interruption processing process.

Embodiment 8

Embodiment 8 provides a working method of a credit card, the credit card includes a micro-processor and a power supply circuit, a displaying circuit and a communicating circuit.

The working method of the credit card includes:

Step 501, the micro-processor powers up and performs system initializing.

In Embodiment 8, the micro-processor is powered up by power supply circuit; performing system initializing includes initializing system hardware and initializing system variable; the hardware includes IO interface and display screen, etc.

Step 502, the micro-processor checks whether interrupt flag is set, if yes, reset the interrupt flag and execute interruption processing, execute Step 503; otherwise, execute Step 503;

In Embodiment 8, the interruption includes communicating interruption, RTC interruption and key pressing interruption; preferably, Step 502 specifically includes:

Step 1, the micro-processor checks whether communicating interrupt flag is set, if yes, reset the communicating interrupt flag and execute communicating interruption processing, execute Step 2; otherwise, execute Step 2.

Step 2, the micro-processor checks whether a key pressing interrupt flag is set, if yes, reset the key pressing interrupt flag and execute Step 503; otherwise, execute Step 503.

In Embodiment 8, content of the communicating interruption processing, RTC interruption processing and key pressing interruption processing is identical to that of Embodiment 4, no more detail is given here.

Further, in Embodiment 8, checking whether respective interruption flags are set in any else order; no more detail is given here.

Step 503, the micro-processor sleeps; when micro-processor is waken up upon detecting interruption and sets the interrupt flag; go back to Step 502.

Specifically, in Embodiment 8, the micro-processor is waken up when the micro-processor detects communicating interruption or RTC interruption; In the case that the micro-processor is waken up upon detecting communicating interruption, the micro-processor enters communicating interruption processing process and sets the communicating interrupt flag, exits the communicating processing process;

in the case that the micro-processor is waken up upon detecting key pressing interruption, the micro-processor enters key pressing interruption processing process, sets the key pressing interrupt flag, exits the key pressing processing process.

Figure 4:
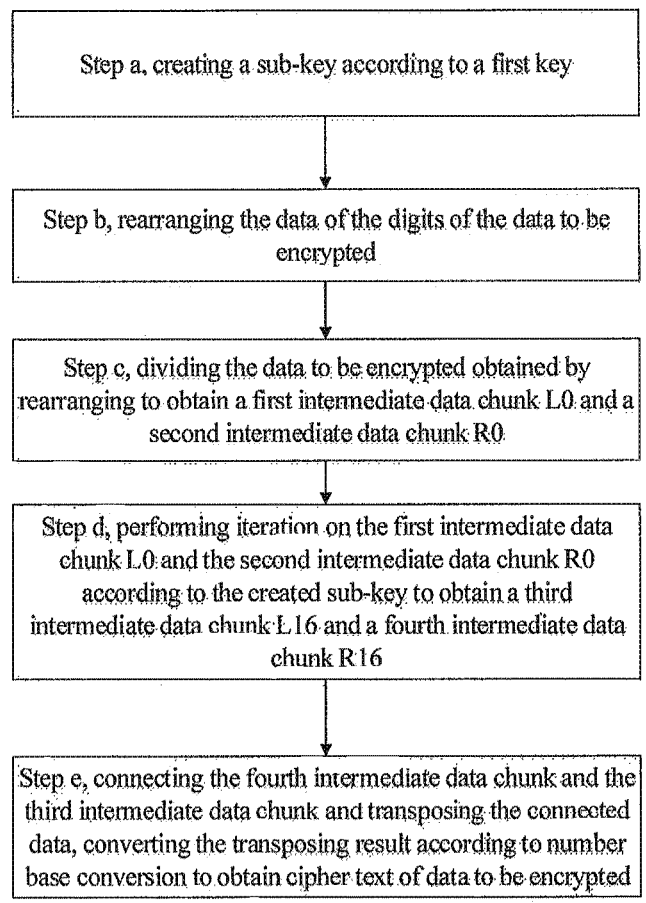
FIG. 4 is a flow chart of encrypting the data to be encrypted by using a preset first key according to the present invention.

Preferably, in the present invention, as shown in FIG. 4, that the first data chunk, the third data chunk or the fourth data chunk are taken to be the data to be encrypted which is encrypted by a preset first key specifically includes:

Step a, creating a sub-key according to a first key.

Preferably, the micro-processor executes following steps to create the sub-key:

Step a1, rearranging the bit data of the first key;

Specifically, numbers in a first preset table are sequence number of the bit data; the bit data of the first key is rearranged according to the sequence number listed in the first preset table.

For example, the first preset table is:

| 57 | 49 | 41 | 33 | 25 | 17 | 9  |
|----|----|----|----|----|----|----|
| 1  | 58 | 50 | 42 | 34 | 26 | 18 |
| 10 | 2  | 59 | 51 | 43 | 35 | 27 |
| 19 | 11 | 3  | 60 | 52 | 44 | 36 |
| 63 | 55 | 47 | 39 | 31 | 23 | 15 |
| 7  | 62 | 54 | 46 | 38 | 30 | 22 |
| 14 | 6  | 61 | 53 | 45 | 37 | 29 |
| 21 | 13 | 5  | 28 | 20 | 12 | 4  |

The first key is 00010011 00110100 01010111 01111001 10011011 10111100 11011111 11110001; the first key obtained by rearranging is: 1111000 0110011 0010101 0101111 0101010 1011001 1001111 0001111.

Step a2, dividing the first key obtained by rearranging to obtain a first key data chunk C0 and a second key data chunk D0.

Specifically, the first key obtained by rearranging is divided evenly.

For example, the first key obtained by rearranging is: 1111000 0110011 0010101 0101111 0101010 1011001 1001111 0001111; the first key data chunk C0 obtained by dividing is: 1111000 0110011 0010101 0101111; the second key data chunk D0 is 0101010 1011001 1001111 0001111.

Step a3, implementing left circular shift on the first key data chunk C0 to obtain a first sub-key data chunk Cn; implementing left circular shift on the second key data chunk D0 to obtain a second sub-key data chunk Dn corresponding to the first sub-key data chunk Cn.

Specifically, left circular shift is implemented on Cn−1 for a preset times to obtain a first sub-key data chunk Cn; left circular shift is implemented on Dn−1 for a preset times to obtain a second sub-key data chunk Dn; the range values of the n is from 1 to 16 orderly; when the value of n is 1, 2, 9 or 16, left circular shift is implemented once, when the value of n is 3, 4, 5, 6, 7, 8, 10, 11, 12, 13, 14 or 15, left circular shift is implemented twice.

Step a4, connecting the first sub-key data chunk Cn and the second sub-key data chunk Dn corresponding to the first sub-key data chunk Cn to obtain a sub-key data chunk CnDn.

Specifically, the obtained Cn and Dn are connected correspondingly, the value of n is taken from 1 to 16 orderly.

Step a5, selecting and arranging the bit data of the sub-key data chunk CnDn to obtain a sub-key Kn.

Specifically, the numbers in a second preset table is the sequence number of the bit data, the data of the digits of the sub-key data chunk CnDn is selected and arranged according to the sequence listed in the second preset table.

For example, the first key data chunk C0 is 1111000 0110011 0010101 0101111; the second key data chunk D0 is 0101010 1011001 1001111 0001111, the following is obtained by implementing left circular shift:

C1=11100001100110010101011111
D1=10101010110011001111000111110
C2=11000011001100101010101111111
D2=01010101100110011111000111101
C3=00001100110010101010101111111
D3=01010110011001111100011110101
C4=00110011001010101011111111100
D4=01011001100111100011110101
C5=11001100101010101011111111100000
D5=01100110011110001111010101
C6=00110010101010111111111000011
D6=10011001111000111010101010101
C7=11001010101011111111100001100
D7=01100111000111010101010110
C8=0010101010111111110000110011
D8=10011110001110101010101011001
C9=01010101011111111100001100110
D9=00111100011110101010101010110011
C10=0101010101111111100001100110011001
D10=111100011110101010101010110011100
C11=010101111111000011001100101
D11=11000111101010101011001100011
C12=0101111111000011001100101010
D12=000111101010101011001100111111
C13=0111111110000110011001010101
D13=0111101010101011001100111100
C14=1111111000011001100101010101
D14=1110101010110110011110001
C15=1111100001100110010101010111
D15=10101010110011001111000111
C16=1111000011001100101010101111
D16=01010101011001100111110001111

The following is obtained by connecting correspondingly:
C1D1=1110000110011001010101011111101010101100-1100111100011110
C2D2=11000011001100101010101111110101010110011-100111100011101
C3D3=00001100110010101010101111111101010101100110-0111100001111
C4D4=0011001100101010101011111111110001011001011001-1110001111010101
C5D5=11001100101010101011111111000001100110011111-1000111101010101
C6D6=0011001010101011111111110000111001011001111110-00111100101010101
C7D7=1100101010101111111111000011000110011110000-11110101010101110
C8D8=001010101011111111000011001100111110001011-1101010101011001
C9D9=010101010111111110000110011000111110001111-10101010110011
C10D10=01010101111111110000110011001111100011111-101010101011001100
C11D11=01010111111111000011001100101110001111001-10101010100110011
C12D12=01011111110000110011001010100011111010-1010110011001111
C13D13=01111111100001100110010101011110101010-101011001100111100
C14D14=11111110000110011001010101011110101010-101100110011110001
C15D15=1111100001100110010101010101111101010101010-110011001111000111

C16D16=1111000011001100101010101111010101010-1100110011110001111

For example, the second preset table is:

| | | | | | |
|---|---|---|---|---|---|
| 14 | 17 | 11 | 24 | 1 | 5 |
| 3 | 28 | 15 | 6 | 21 | 10 |
| 23 | 19 | 12 | 4 | 26 | 8 |
| 16 | 7 | 27 | 20 | 13 | 2 |
| 41 | 52 | 31 | 37 | 47 | 55 |
| 30 | 40 | 51 | 45 | 33 | 48 |
| 44 | 49 | 39 | 56 | 34 | 53 |
| 46 | 42 | 50 | 36 | 29 | 32 |

The sub-key obtained after selecting and arranging by the second preset table is:

K1=000110110000 001011 101111 111111 000111 000001 110010;

K2=011110 011010 111011 011001 110110 111100 100111 100101

K3=010101 011111 110010 001010 010000 101100 111110 011001

K4=011100 101010 110111 010110 110110 110011 010100 011101

K5=011111 001110 110000 000111 111010 110101 001110 101000

K6=011000 111010 010100 111110 010100 000111 101100 101111

K7=111011 001000 010010 110111 111101 100001 100010 111100

K8=111101 111000 101000 111010 110000 010011 101111 111011

K9=111000 001101 101111 101011 111011 011110 011110 000001

K10=101100 011111 001101 000111 101110 100100 011001 001111

K11=001000 010101 111111 010011 110111 101101 001110 000110

K12=011101 010111 000111 110101 100101 000110 011111 101001

K13=100101 111100 010111 010001 111110 101011 101001 000001

K14=010111 110100 001110 110111 111100 101110 011100 111010

K15=101111 111001 000110 001101 001111 010011 111100 001010

K16=110010 110011 110110 001011 000011 100001 011111 110101

Step b, rearranging the data of the digits of the data to be encrypted.

Specifically, the number of a third preset table is sequence number of the bit data, the data of the digits of the data to be encrypted is rearranged according to the sequence listed in the third preset table.

For example, the third preset table is:

| | | | | | | | |
|---|---|---|---|---|---|---|---|
| 58 | 50 | 42 | 34 | 26 | 18 | 10 | 2 |
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9 | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 5 | 7 |

The data to be encrypted is 0000 0001 0010 0011 0100 0101 0110 0111 1000 1001 1010 1011 1100 1101 1110 1111; and the data to be encrypted obtained by rearranging is 1100 1100 0000 0000 1100 1100 1111 1111 1111 0000 1010 1010 1111 0000 1010 1010.

Step c, dividing the data to be encrypted obtained by rearranging to obtain a first intermediate data chunk L0 and a second intermediate data chunk R0.

Specifically, the data to be encrypted obtained by rearranging is divided evenly.

For example, the data to be encrypted obtained by rearranging is 1100 1100 0000 0000 1100 1100 1111 1111 1111 0000 1010 1010 1111 0000 1010 1010, the first intermediate data chunk L0 obtained by dividing is 1100 1100 0000 0000 1100 1100 1111 1111; the second intermediate data chunk R0 obtained by dividing is 1111 0000 1010 1010 1111 0000 1010 1010.

Step d, performing iteration on the first intermediate data chunk L0 and the second intermediate data chunk R0 according to the created sub-key to obtain a third intermediate data chunk L16 and a fourth intermediate data chunk R16.

Specifically, the micro-processor performs iteration on the first intermediate data chunk L0 and the second intermediate data chunk R0 for 16 times; each iteration includes: assigning Ln to Rn−1, extending Rn−1 according to a preset extended table, performing exclusive OR operation on the extended Rn−1 and the sub-key Kn, performing packet conversion on a result obtained by performing exclusive OR operation according to a preset sequence, transposing a result of packet conversion according to the third preset table, performing exclusive or on the result of packet conversion and Ln−1 to obtain Rn; selecting 1 to 16 as value of n.

Rn−1 is expended according to the preset extended table; preferably, numbers in the preset extended table are taken as sequence numbers of bit data, the data of the digits of Rn−1 is expended and arranged according to the sequence listed in the preset extended table.

Packet conversion is performed on the result obtained by performing exclusive OR operation according to the preset sequence; preferably, the result obtained by performing exclusive OR operation is divided in groups, i.e. preferably, 6 digits is regarded as 1 group, operation is performed on data of each group obtained by dividing respectively; data corresponding to operation result is searched in a preset table corresponding to each group data, the found data is converted to be binary data and the result of packet conversion is obtained by connecting binary data orderly.

The result of packet conversion is transposed according to a fourth preset table; preferably, numbers in the fourth preset table is taken as sequence numbers of the bit data; the bit data of the result of packet conversion is rearranged according to the sequence listed in the fourth preset table.

For example, R0 is 1111 0000 1010 1010 1111 0000 1010 1010; L0 is 1100 1100 0000 0000 1100 1100 1111 1111; the preset extended table is:

| | | | | | |
|---|---|---|---|---|---|
| 32 | 1 | 2 | 3 | 4 | 5 |
| 4 | 5 | 6 | 7 | 8 | 9 |
| 8 | 9 | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1 |

The sub-key K1 is 000110 110000 001011 101111 111111 000111 000001 110010, the result of packet conversion is divided by taking every 6 digits as one group, by which 8 groups is obtained; the preset tables corresponds to each group is the following orderly:

Preset table S1:

| 14 | 4  | 13 | 1  | 2  | 15 | 11 | 8  | 3  | 10 | 6  | 12 | 5  | 9  | 0  | 7  |
|----|----|----|----|----|----|----|----|----|----|----|----|----|----|----|----|
| 0  | 15 | 7  | 4  | 14 | 2  | 13 | 1  | 10 | 6  | 12 | 11 | 9  | 5  | 3  | 8  |
| 4  | 1  | 14 | 8  | 13 | 6  | 2  | 11 | 15 | 12 | 9  | 7  | 3  | 10 | 5  | 0  |
| 15 | 12 | 8  | 2  | 4  | 9  | 1  | 7  | 5  | 11 | 3  | 14 | 10 | 0  | 6  | 13 |

Preset table S2:

| 15 | 1  | 8  | 14 | 6  | 11 | 3  | 4  | 9  | 7  | 2  | 13 | 12 | 0  | 5  | 10 |
|----|----|----|----|----|----|----|----|----|----|----|----|----|----|----|----|
| 3  | 13 | 4  | 7  | 15 | 2  | 8  | 14 | 12 | 0  | 1  | 10 | 6  | 9  | 11 | 5  |
| 0  | 14 | 7  | 11 | 10 | 4  | 13 | 1  | 5  | 8  | 12 | 6  | 9  | 3  | 2  | 15 |
| 13 | 8  | 10 | 1  | 3  | 15 | 4  | 2  | 11 | 6  | 7  | 12 | 0  | 5  | 14 | 9  |

Preset table S3:

| 10 | 0  | 9  | 14 | 6  | 3  | 15 | 5  | 1  | 13 | 12 | 7  | 11 | 4  | 2  | 8  |
|----|----|----|----|----|----|----|----|----|----|----|----|----|----|----|----|
| 13 | 7  | 0  | 9  | 3  | 4  | 6  | 10 | 2  | 8  | 5  | 14 | 12 | 11 | 15 | 1  |
| 13 | 6  | 4  | 9  | 8  | 15 | 3  | 0  | 11 | 1  | 2  | 12 | 5  | 10 | 14 | 7  |
| 1  | 10 | 13 | 0  | 6  | 9  | 8  | 7  | 4  | 15 | 14 | 3  | 11 | 5  | 2  | 12 |

Preset table S4:

| 7  | 13 | 14 | 3  | 0  | 6  | 9  | 10 | 1  | 2  | 8  | 5  | 11 | 12 | 4  | 15 |
|----|----|----|----|----|----|----|----|----|----|----|----|----|----|----|----|
| 13 | 8  | 11 | 5  | 6  | 15 | 0  | 3  | 4  | 7  | 2  | 12 | 1  | 10 | 14 | 9  |
| 10 | 6  | 9  | 0  | 12 | 11 | 7  | 13 | 15 | 1  | 3  | 14 | 5  | 2  | 8  | 4  |
| 3  | 15 | 0  | 6  | 10 | 1  | 13 | 8  | 9  | 4  | 5  | 11 | 12 | 7  | 2  | 14 |

Preset table S5:

| 2  | 12 | 4  | 1  | 7  | 10 | 11 | 6  | 8  | 5  | 3  | 15 | 13 | 0  | 14 | 9  |
|----|----|----|----|----|----|----|----|----|----|----|----|----|----|----|----|
| 14 | 11 | 2  | 12 | 4  | 7  | 13 | 1  | 5  | 0  | 15 | 10 | 3  | 9  | 8  | 6  |
| 4  | 2  | 1  | 11 | 10 | 13 | 7  | 8  | 15 | 9  | 12 | 5  | 6  | 3  | 0  | 14 |
| 11 | 8  | 12 | 7  | 1  | 14 | 2  | 13 | 6  | 15 | 0  | 9  | 10 | 4  | 5  | 3  |

Preset table S6:

| 12 | 1  | 10 | 15 | 9  | 2  | 6  | 8  | 0  | 13 | 3  | 4  | 14 | 7  | 5  | 11 |
|----|----|----|----|----|----|----|----|----|----|----|----|----|----|----|----|
| 10 | 15 | 4  | 2  | 7  | 12 | 9  | 5  | 6  | 1  | 13 | 14 | 0  | 11 | 3  | 8  |
| 9  | 14 | 15 | 5  | 2  | 8  | 12 | 3  | 7  | 0  | 4  | 10 | 1  | 13 | 11 | 6  |
| 4  | 3  | 2  | 12 | 9  | 5  | 15 | 10 | 11 | 14 | 1  | 7  | 6  | 0  | 8  | 13 |

Preset table S7:

| 4  | 11 | 2  | 14 | 15 | 0  | 8  | 13 | 3  | 12 | 9  | 7  | 5  | 10 | 6  | 1  |
|----|----|----|----|----|----|----|----|----|----|----|----|----|----|----|----|
| 13 | 0  | 11 | 7  | 4  | 9  | 1  | 10 | 14 | 3  | 5  | 12 | 2  | 15 | 8  | 6  |
| 1  | 4  | 11 | 13 | 12 | 3  | 7  | 14 | 10 | 15 | 6  | 8  | 0  | 5  | 9  | 2  |
| 6  | 11 | 13 | 8  | 1  | 4  | 10 | 7  | 9  | 5  | 0  | 15 | 14 | 2  | 3  | 12 |

Preset table S8:

| 13 | 2  | 8  | 4  | 6  | 15 | 11 | 1  | 10 | 9  | 3  | 14 | 5  | 0  | 12 | 7  |
|----|----|----|----|----|----|----|----|----|----|----|----|----|----|----|----|
| 1  | 15 | 13 | 8  | 10 | 3  | 7  | 4  | 12 | 5  | 6  | 11 | 0  | 14 | 9  | 2  |
| 7  | 11 | 4  | 1  | 9  | 12 | 14 | 2  | 0  | 6  | 10 | 13 | 15 | 3  | 5  | 8  |
| 2  | 1  | 14 | 7  | 4  | 10 | 8  | 13 | 15 | 12 | 9  | 0  | 3  | 5  | 6  | 11 |

The fourth preset table:

| 16 | 7  | 20 | 21 |
|----|----|----|----|
| 29 | 12 | 28 | 17 |
| 1  | 15 | 23 | 26 |
| 5  | 18 | 31 | 10 |
| 2  | 8  | 24 | 14 |
| 32 | 27 | 3  | 9  |
| 19 | 13 | 30 | 6  |
| 22 | 11 | 4  | 25 |

When value of n is 1, R0 is assigned to L1, by which L1=1111 0000 1010 1010 1111 0000 1010 1010 is obtained; R0 is extended according to the preset extended table; extended R0 is 011110 100001 010101 010101 011110 100001 010101 010101; exclusive OR operation is performed on the extended R0 and K1 to obtain a result of exclusive OR operation 011000 010001 011110 111010 100001 100110 010100 100111; the result of exclusive OR operation is divided in 8 groups of data: 011000, 010001, 011110, 111010, 100001, 100110, 010100, 100111; the first digit and the eighth digit of each group are connected and the connected data is converted to be decimal data, line sequence 0, 1, 0, 2, 3, 2, 0, 3 is obtained; the second digit and the fifth digit of each group of data are connected, the connected data is converted to decimal data, row sequence 12, 8, 15, 13, 0, 3, 10, 3 is obtained; the data of the zeroth line and the twelfth row in the preset table S1 is found to be 5; the data of the first line and the eighth row in the preset table S2 is found to be 12; the data of the zeroth line and the fifteenth row in the preset table S3 is found to be 8; the data of the second line and the thirteenth row in the preset table S4 is found to be 2; the data of the third line and the zeroth row in the preset table S5 is found to be 11; the data of the second line and the third row in the preset table S6 is found to be 5; the data of the zeroth line and the tenth row in the preset table S7 is found to be 9; the data of the third line and the third row in the preset table S8 is found to be 7; the found data are converted to binary data and the binary data are connected orderly together to obtain packet conversion result 0101 1100 1000 0010 1011 0101 1001 0111; the bit data of the result of packet conversion are rearranged according to the sequence of the fourth preset table to obtain the transposing result 0010 0011 0100 1010 1010 1001 1011 1011; exclusive OR operation is performed on the transposing result and L0 to obtain the first iteration operation result 1110 1111 0100 1010 0110 0101 0100 0100.

Step e, connecting the fourth intermediate data chunk and the third intermediate data chunk and transposing the connected data, converting the transposing result according to number base conversion to obtain cipher text of data to be encrypted;

Specifically, the fourth intermediate data chunk and the third intermediate data chunk are connected orderly, the bit data of connected data is rearranged by taking numbers in the fifth preset table as the sequence number in the fifth preset table according to the sequence listed in the fifth preset table to obtain the transposing result, the transposing result is converted to be hexadecimal data, by which the ciphertext of data to be encrypted is obtained;

For example, the fifth preset table is:

| 40 | 8 | 48 | 16 | 56 | 24 | 64 | 32 |
|----|---|----|----|----|----|----|----|
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9  | 49 | 17 | 57 | 25 |

The third data chunk is 0100 0011 0100 0010 0011 0010 0011 0100; the fourth data chunk is 0000 1010 0100 1100 1101 1001 1001 0101; the data obtained by connecting the fourth intermediate data chunk and the third intermediate data chunk orderly is 00001010 01001100 11011001 10010101 01000011 01000010 00110010 00110100; the bit data of the connected data is rearranged according to the sequence listed in the fifth preset table to obtain a transposing result 10000101 11101000 00010011 01010100 00001111 00001010 10110100 00000101; the transposing result is converted to hexadecimal data, by which the second ciphertext data 85E813540F0AB405 is obtained.

Correspondingly, in the present invention, the third data chunk ciphertext is data to be decrypted; data to be decrypted by using the second preset key specifically includes:

Step f, creating sub-key according to the second key.

Preferably, the micro-processor executes following steps to create the sub-key:

Step f1, rearranging the bit data of the second key;

Specifically, the numbers in the first preset table are sequence numbers of bit data; the bit data of the second key is rearranged according to the sequence listed in the first preset table.

Step f2, dividing the rearranged second key to obtain a third key data chunk C'0 and a fourth key data chunk D'0.

Specifically, the rearranged second key is divided evenly.

Step f3, implementing left circular shift on the third key data chunk C'0 to obtain a third sub-key data chunk C'n; implementing left circular shift on the fourth key data chunk D'0 to obtain a fourth sub-key data chunk D'n corresponding to the third sub-key data chunk C'n.

Specifically, left circular shift is implemented on C'n-1 for a preset times to obtain a first sub-key data chunk C'n; left circular shift is implemented on D'n-1 for a preset times to obtain a second sub-key data chunk D'n; the range values of the n is from 1 to 16 orderly; when the value of n is 1, 2, 9 or 16, left circular shift is implemented once, when the value of n is 3, 4, 5, 6, 7, 8, 10, 11, 12, 13, 14 or 15, left circular shift is implemented twice.

Step f4, connecting the third sub-key data chunk C'n and the fourth sub-key data chunk D'n corresponding to the third sub-key data chunk C'n to obtain a sub-key data chunk CnDn;

Specifically, the obtained C'n and D'n are connected correspondingly, the value of n is taken from 1 to 16 orderly;

Step f5, selecting and arranging the bit data of the sub-key data chunk C'nD'n to obtain a sub-key K'n.

Specifically, the numbers in a second preset table is the sequence number of the bit data, the data of the digits of the sub-key data chunk C'nD'n is selected and arranged according to the sequence listed in the second preset table; the value of n is selected as 1 to 16 orderly.

Step g, rearranging the bit data of the data to be decrypted.

In the present invention, the bit data of the data to be decrypted includes the third data chunk cipher text.

Specifically, taking the data of a third preset table as sequence number of the bit data, bit data of the data to be decrypted is rearranged according to the sequence listed in the third preset table.

Step h, dividing the data to be decrypted which is rearranged to obtain a fifth intermediate data chunk L'0 and a sixth intermediate data chunk R'0.

Specifically, the data to be decrypted which is rearranged is divided evenly.

Step i, performing iteration on the fifth intermediate data chunk L'0 and the sixth intermediate data chunk R'0 to obtain a seventh intermediate data chunk L'16 and an eighth intermediate data chunk R'16.

Specifically, the micro-processor performs iteration on the fifth intermediate data chunk L'0 and the sixth intermediate data chunk R'0 for 16 times, each iteration includes: assigning R'n-1 to L'n; extending R'n-1 according to a preset extended table; performing exclusive OR operation on the extended R'n-1 and the sub-key K'16-n; performing packet conversion on a result of exclusive OR operation; transposing a result of exclusive OR operation according to the third preset table; performing exclusive OR operation on the result of transposing and L'n-1 to obtain R'n; value of n is from 1 to 16 orderly.

R'n-1 is extended according to the preset extended table; preferably, numbers in the preset extended table is sequence numbers of bit data; the bit data of R'n-1 is extended and arranged according to the sequence listed in the preset extended table.

Packet conversion is performed on the result obtained by performing exclusive OR operation according to the preset sequence; preferably, the result obtained by performing exclusive OR operation is divided in groups, i.e. preferably, 6 digits is regarded as 1 group, operation is performed on data of each group obtained by dividing respectively; data corresponding to operation result is searched in a preset table corresponding to each group data, the found data is converted to be binary data and the result of packet conversion is obtained by connecting binary data orderly.

The result of packet conversion is transposed according to a fourth preset table; preferably, numbers in the fourth preset table is taken as sequence numbers of the bit data; the bit data of the result of packet conversion is rearranged according to the sequence listed in the fourth preset table; Step j, connecting the eighth intermediate data chunk and the seventh intermediate data chunk and transposing the connected data, converting the transposing result according to number base conversion to obtain plain text of data to be decrypted.

Specifically, the eighth intermediate data chunk and the seventh intermediate data chunk are connected orderly, the bit data of connected data is rearranged by taking numbers in the fifth preset table as the sequence number in the fifth preset table according to the sequence listed in the fifth preset table to obtain the transposing result, the transposing result is converted to be hexadecimal data, by which the plain text of data to be decrypted is obtained.

Embodiment 9

Figure 5:
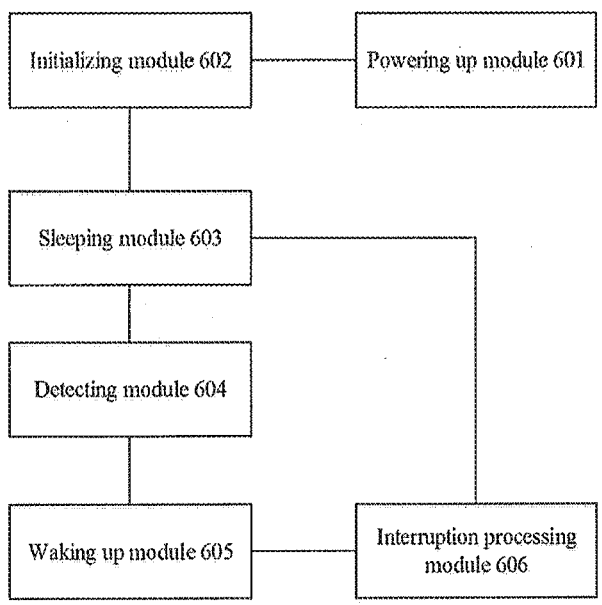
FIG. 5 is a block diagram of a micro-processor of Embodiment 9 of the present invention.

Embodiment 9 provides a credit card, with which a micro-processor is built in; as shown in FIG. 5, the micro-processor includes:

a powering up module 601 configured for the micro-processor to power up;

an initializing module 602 configured to perform system initializing after the micro-processor powers up;

a sleeping module 603 configured for the micro-processor to sleep after initializing;

a detecting module 604 configured to detect a preset interruption when the micro-processor sleeps;

a waking up module 605 configured for the micro-processor to be waken up after detecting the preset interruption;

an interruption processing module 606 is configured for the micro-processor to enter a preset interruption processing process after being waken up and perform preset interruption processing; exit the preset interruption processing process when the preset interruption processing is completed; and the sleeping module 603 is further configured for the micro-processor to sleep after exit the preset interruption.

In this case, the interruption processing module 606 specifically includes:

an obtaining unit configured to obtain a dynamic security code factor;

a storing unit configured to store card personalized data;

a generating unit configured to generate bit torrent according to the dynamic security code factor obtained by the obtaining unit and card personalized data stored in the storing unit;

a dividing unit configured to divide the bit torrent generated by the generating unit into a first data chunk and a second data chunk;

an encrypting unit configured to take the first data chunk as data to be encrypted, encrypting the data to be encrypted to obtain a first data chunk ciphertext;

an exclusive OR operation performing unit configured to perform exclusive OR operation on the first data chunk ciphertext obtained by the encrypting unit and a second data chunk obtained by the dividing unit to obtain a third data chunk;

an encrypting unit further configured to take the third data chunk obtained by the exclusive OR operation performing unit as data to be encrypted, encrypting the data to be encrypted to obtain a third data chunk ciphertext;

a decrypting unit configured to take the third data chunk ciphertext obtained by the encrypting unit as data to be decrypted, decrypt the data to be decrypted to obtain a fourth data chunk;

an encrypting unit further configured to take the fourth data chunk obtained by the decrypting unit as data to be encrypted, encrypting the data to the encrypted to obtain a fourth data chunk ciphertext;

a processing unit configured to extract, convert and sort the fourth data chunk ciphertext obtained by the encrypting unit, take a preset part of processing result as a current valid credit card security code; and a displaying unit configured to control and display the current valid credit card security code.

In Embodiment 9, the detecting module 604 specifically is configured to detect real clock interruption when the micro-processor sleeps.

Correspondingly, the waking up module 605 is specifically configured to be waken up when the micro-processor detects real-time clock interruption; the interruption processing module 606 is specifically configured to enter real-time clock interruption processing process to execute real-time clock interruption processing; to exit real-time clock interruption processing process when real-time clock interruption processing is completed.

Further, the interruption processing module 606 further includes an updating unit and a determining unit;

the updating unit is configured to update time;

the determining unit is configured to determine whether requires to update credit card security code.

Correspondingly, the obtaining unit specifically is configured to obtain a current time factor when the determining unit determines that updating credit card security code is required.

Or, in Embodiment 9, the detecting module 604 specifically is configured to detect key interruption when the micro-processor sleeps.

Correspondingly, the waking up module 605 is specifically configured for the micro-processor to be waken up after detecting key interruption; the interruption processing module 606 is specifically configured to enter key interruption processing process and executes key interruption processing after the micro-processor is waken up; to exit key interruption processing process when the key interruption processing is completed.

Further, the interruption processing module 606 further includes updating unit;

the updating unit is configured to update key pressing times;

Correspondingly, the obtaining unit is specifically configured to obtain a current event factor according to key pressing times.

Or in Embodiment 9, the detecting module 604 is specifically to detect key interruption and real-time clock interruption; correspondingly, the waking up module 605 is specifically configured to be waken up after the micro-processor detects key interruption or real-time clock interruption;

the interruption processing 606 is specifically configured to enter key interruption processing process and executes key interruption processing when the micro-processor is waken up upon detecting key interruption and; to exit key interruption processing process when the key interruption processing is completed; to enter real-time clock interruption processing process when the micro-processor is waken up upon detecting real-time clock interruption; to exit real-time clock interruption processing process when the real-time clock interruption processing is completed.

The interruption processing module 606 further includes: a real-time interruption processing unit configured to update counting time;

Correspondingly, the obtaining unit is specifically configured to obtain a current counting time factor according to the time.

In Embodiment 9, the detecting module 604 is further configured to detect communication interruption when the micro-processor sleeps; correspondingly, the waking up module 605 is further configured to be waken up when the micro-processor detects communication interruption;

the interruption processing module 606 is further configured to enter communication processing process to execute communication interruption processing process when the micro-processor is waken up upon detecting communication interruption; to exit communication interruption process when the communication interruption processing is completed;

the interruption processing module 606 further includes a communication interruption processing unit and a determining unit; in this case, the communication interruption processing unit is configured to receive communication data and perform card personalizing according to the received communication data; the determining unit is configured to determine whether card personalizing is completed. Correspondingly, the obtaining unit is specifically configured to obtain a dynamic security factor when the detecting unit determines that card personalizing is completed.

Further, the communication interruption processing unit can be specifically configured to receive communication data, write card personalized data and a preset key in a storing unit according to the received communication data.

Further, the communication interruption processing unit can specifically configured to receive communication data, write a main account, an expiration date of card and a service code sequence and a preset key in the storing unit.

Correspondingly, the generating unit is specifically configured to replace data of the first preset length in the main account, which is stored in the storing unit, with the current time factor, which is obtained by the obtaining module, to obtain a changed main account, connect the changed main account and the service code sequence orderly to obtain a connecting data, adding preset data to the right side of the connecting data to obtain the bit torrent with a second preset length.

In Embodiment 9, the dividing unit can specifically be configured to evenly divide the bit torrent, which is obtained by the generating unit, into a first data chunk and a second data chunk.

In Embodiment 9, the processing unit can specifically configured to extract all numbers between the first data and the second data in the fourth chunk data chunk ciphertext from the beginning of the left side of the fourth data chunk ciphertext, which obtained by the encrypting unit, to obtain a first extracting data; to extract all numbers between the third data and the fourth data in the fourth chunk data chunk ciphertext from the beginning of the left side of the fourth data chunk ciphertext to obtain a second extracting data; to replace each number in the second extracting data with its corresponding difference of the number and the fifth data to obtain a converted second extracting data; to connect the first extracting data and the converted second extracting data orderly to obtain a processing result.

In Embodiment 9, the preset key written by the communication interruption processing unit in the storing unit includes a first key;

the encrypting unit specifically includes:
a creating sub-unit configured to create a sub-key according to the first key;
an arranging unit configured to rearrange the bit data of the data to be encrypted;
a dividing sub-unit configured to divide the rearranged data to be encrypted to obtain a first intermediate data chunk and a second intermediate chunk;
an iterating sub-unit configured to perform iteration on the first intermediate data chunk and the second intermediate data chunk, which are obtained by the dividing sub-unit, according to the created sub-key obtained by the creating sub-unit to obtain a third intermediate data chunk and a fourth intermediate data chunk; and
a transposing sub-unit configured to connect the fourth intermediate data chunk and the third intermediate data chunk, which are obtained by the iterating sub-unit, and transpose the connected data, convert the transposing result according to number base conversion to obtain cipher text of data to be encrypted.

Further, the creating sub-unit is specifically configured to rearrange the bit data of the first key; divide the arranged first key to obtain a first key data chunk and a second data chunk; implement left circular shift on the first key data chunk to obtain a first sub-key data chunk; implement left circular shift on the second key data chunk to obtain a second sub-key data chunk corresponding to the first sub-key data chunk; connect the first sub-key data chunk and the second sub-key data chunk corresponding to the first sub-key data chunk to obtain a sub-key data chunk; select and arrange the bit data of the sub-key data chunk to obtain a sub-key.

In Embodiment 9, the preset key written by the communication interruption unit in to the storing unit further includes a second key;

the decrypting unit specifically includes:
a creating sub-unit configured to create a sub-key according to the second key;
an arranging unit configured to rearrange the bit data of the data to be encrypted;
a dividing sub-unit configured to divide the rearranged data to be encrypted to obtain a fifth intermediate data chunk and a sixth intermediate chunk;
an iterating sub-unit configured to perform iteration on the fifth intermediate data chunk and the sixth intermediate data chunk, which are obtained by the dividing sub-unit, to obtain a seventh intermediate data chunk and a eighth intermediate data chunk;
a transposing sub-unit configured to connect the eighth intermediate data chunk and the seventh intermediate data chunk, which are obtained by the iterating sub-unit, and transpose the connected data, convert the transposing result according to number base conversion to obtain cipher text of data to be encrypted.

Further, the creating sub-unit is specifically configured to rearrange the bit data of the second key; divide the arranged second key to obtain a third key data chunk and a fourth data chunk; implement left circular shift on the third key data chunk to obtain a third sub-key data chunk; implement left circular shift on the fourth key data chunk to obtain a fourth sub-key data chunk corresponding to the third sub-key data chunk; connect the third sub-key data chunk and the fourth sub-key data chunk corresponding to the third sub-key data chunk to obtain a sub-key data chunk; select and arrange the bit data of the sub-key data chunk to obtain a sub-key.

Embodiment 10

Figure 6:
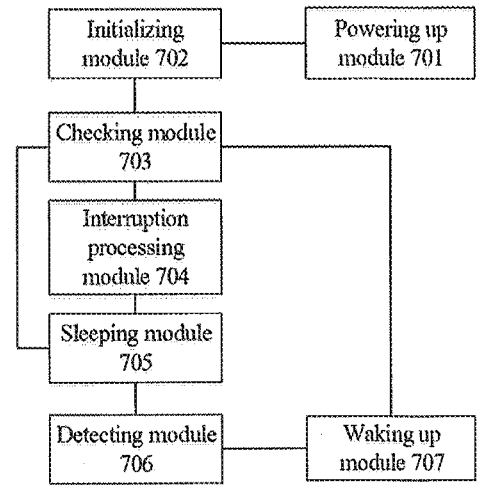
FIG. 6 is a block diagram of a micro-processor of Embodiment 10 of the present invention.

Embodiment 10 provides a credit card, with which a micro-processor is built in; as shown in FIG. 6, the micro-processor includes:

a powering up module 701 configured for the micro-processor to power up;
an initializing module 702 configured to perform system initializing after the micro-processor powers up;
a checking module 703 configured to check whether a preset interrupt flag is set after the micro-processor performs system initializing;
an interruption processing module 704 configured to reset preset interruption flag upon detecting that the preset interruption flag is set and perform preset interruption processing;
a sleeping module 705 configured to sleep when the micro-processor checks that no interruption flag is set;
a detecting module 706 configured to detect preset interruption when the micro-processor sleeps; and
a waking up module 707 configured to enter a preset interruption processing process to set a preset interruption flag when the micro-processor is waken up upon detecting the preset interruption, exit the preset interruption processing process;
a checking module 703 is further configured to check whether the preset interruption flag is set after the micro-process exits interruption processing process.

In this case, the interruption processing module specifically includes:

an obtaining unit configured to obtain a dynamic security code factor;

a storing unit configured to store card personalized data;

a generating unit configured to generate bit torrent according to the dynamic security code factor obtained by the obtaining unit and card personalized data in the storing unit;

a dividing unit configured to divide the bit torrent generated by the generating unit into a first data chunk and a second data chunk;

an encrypting unit configured to take the first data chunk as data to be encrypted, encrypting the data to be encrypted to obtain a first data chunk ciphertext; further configured to take the third data chunk obtained by the exclusive OR operation performing unit as data to be encrypted, encrypting the data to be encrypted to obtain a third data chunk ciphertext; further configured to take the fourth data chunk obtained by the decrypting unit as data to be encrypted, encrypting the data to the encrypted to obtain a fourth data chunk ciphertext;

an exclusive OR operation performing unit configured to perform exclusive OR operation on the first data chunk ciphertext obtained by the encrypting unit and a second data chunk obtained by the dividing unit to obtain a third data chunk;

a decrypting unit configured to take the third data chunk ciphertext obtained by the encrypting unit as data to be decrypted, decrypt the data to be decrypted to obtain a fourth data chunk;

a processing unit configured to extract, convert and sort the fourth data chunk ciphertext obtained by the encrypting unit, take a preset part of processing result as a current valid credit card security code; and a displaying unit configured to control and display the current valid credit card security code.

In Embodiment 10, the checking module 703 is specifically configured to check whether the real-time clock interruption flag is set when the micro-processer performs system initializing; and checks whether the real-time clock interruption flag is set after the micro-processor exits interruption processing process.

Correspondingly, the interruption processing 704 is specifically configured to reset real-time clock interruption flag when the micro-processor determines that the real-time clock interruption flag is set by checking, to execute real-time clock interruption processing; the checking module 706 specifically configured to check real-time clock interruption when the micro-processor sleeps; the waking up module 707 is specifically configured to enter real-time clock interruption processing process when the micro-processor is waken up upon detecting real-time clock interruption; set the real-time clock interruption flag and exit real-clock interruption processing process.

Further, the interruption processing module further include an updating unit and a determining unit.

The updating unit configured to update counting time.

The determining unit configured to determine whether requires updating the credit card security code.

Correspondingly, the obtaining unit specifically configured to obtain a current time factor according to counting time when the determining unit determines that the credit card security code requires to be updated.

Or, in Embodiment 10, the checking module 703 is specifically configured to check whether a key interruption flag is set after the micro-processor performs system initial-izing and check whether the key interruption flag is set after the micro-processor exits interruption processing process.

Correspondingly, the interruption processing module 704 is specifically configured to reset the key interruption flag when the micro-processor checks and finds that the key interruption flag is set and execute key interruption processing; the checking module 706 is specifically configured to check key interruption when the micro-processor sleeps; the waking up module 707 is specifically configured to wake up the micro-processor upon detecting key interruption, enter key interruption processing process to set the key interruption flag and exit the key interruption processing process.

Further, the interruption processing module 704 further includes an updating unit:

the updating unit is configured to update key pressing times.

Correspondingly, the obtaining unit specifically configured to obtain a current event factor according to the key pressing times.

Or, in Embodiment 10, the checking module 703 is specifically configured to check whether the key interruption flag and the real-time clock interruption flag are set after the micro-processor performs system initializing; and to check the key interruption flag and the real-time clock interruption flag are set after the micro-processor exits interruption processing process.

Correspondingly, the interruption processing module 704 is specifically configured to reset the key interruption flag when the micro-processor checks and finds that the key interruption flag is set and execute key interruption processing; and to reset the real-time clock interruption flag when the when the micro-processor checks and finds that the real-time clock interruption flag is set; the checking module 706 is specifically configured to detect the key interruption and the real-time interruption when the micro-processor sleeps; the waking up module 707 is specifically configured to wake up the micro-processor upon detecting key interruption, enter key interruption processing process to set the key interruption flag, exit the key interruption processing process, wake up the micro-processor upon detecting the real-time clock interruption, enter the real-time clock interruption processing process, set the real-time clock interruption flag and exit the real-time clock interruption process.

The interruption processing module 704 further includes:

a real-time clock interruption processing unit configured to update counting time.

Correspondingly, the obtaining unit is specifically configured to obtain a current time factor according to counting time.

In Embodiment 10, the checking module 703 is further configured to check whether a communication interruption flag is set after the micro-processor performs system initializing and check whether the communication interruption flag is set after the micro-processor exits the interruption processing process; correspondingly, the interruption processing module 704 further is configured to reset the communication interruption flag when the micro-processor checks and finds that the communication interruption flag is set, execute communication interruption processing;

the detecting module 706 further is configured to detect communication interruption when the micro-processor sleeps;

the waking up module 707 further is configured to wake up the micro-processor when the micro-processor detects communication interruption, enter the communication interruption processing process and set the communication interruption flag, exit the communication interruption processing process;

the interruption processing module 704 further includes a communication interruption processing unit and a determining unit; in this case, the communication interruption processing unit is configured to receive communication data and perform card personalizing according to the received communication data; the determining unit is configured to determine whether the card personalizing is completed. Correspondingly, the obtaining unit is specifically configured to obtain the dynamic security factor when the determining unit determines that card personalizing is completed.

Further, the communication interruption processing unit can specifically configured to receive communication data, write card personalized data and the preset key in the storing unit according to the received communication data.

Further, the communication interruption processing unit can specifically configured to receive communication data, write a main account, an expiration date of card and a service code sequence and a preset key in the storing unit.

Correspondingly, the generating unit is specifically configured to replace data of the first preset length in the main account, which is stored in the storing unit, with the current time factor, which is obtained by the obtaining module, to obtain a changed main account, connect the changed main account and the service code sequence orderly to obtain a connecting data, adding preset data to the right side of the connecting data to obtain the bit torrent with a second preset length.

In Embodiment 10, the dividing unit can specifically be configured to evenly divide the bit torrent, which is obtained by the generating unit, into a first data chunk and a second data chunk.

In Embodiment 10, the processing unit can specifically configured to extract all numbers between the first data and the second data in the fourth chunk data chunk ciphertext from the beginning of the left side of the fourth data chunk ciphertext, which obtained by the encrypting unit, to obtain a first extracting data; to extract all numbers between the third data and the fourth data in the fourth chunk data chunk ciphertext from the beginning of the left side of the fourth data chunk ciphertext to obtain a second extracting data; to replace each number in the second extracting data with its corresponding difference of the number and the fifth data to obtain a converted second extracting data; to connect the first extracting data and the converted second extracting data orderly to obtain a processing result.

In Embodiment 10, the preset key written by the communication interruption processing unit in the storing unit includes a first key;

the encrypting unit specifically includes:

a creating sub-unit configured to create a sub-key according to the first key;

an arranging unit configured to rearrange the bit data of the data to be encrypted;

a dividing sub-unit configured to divide the rearranged data to be encrypted to obtain a first intermediate data chunk and a second intermediate chunk;

an iterating sub-unit configured to perform iteration on the first intermediate data chunk and the second intermediate data chunk, which are obtained by the dividing sub-unit, according to the created sub-key obtained by the creating sub-unit to obtain a third intermediate data chunk and a fourth intermediate data chunk;

a transposing sub-unit configured to connect the fourth intermediate data chunk and the third intermediate data chunk, which are obtained by the iterating sub-unit, and transpose the connected data, convert the transposing result according to number base conversion to obtain cipher text of data to be encrypted.

Further, the creating sub-unit is specifically configured to rearrange the bit data of the first key; divide the arranged first key to obtain a first key data chunk and a second data chunk; implement left circular shift on the first key data chunk to obtain a first sub-key data chunk; implement left circular shift on the second key data chunk to obtain a second sub-key data chunk corresponding to the first sub-key data chunk; connect the first sub-key data chunk and the second sub-key data chunk corresponding to the first sub-key data chunk to obtain a sub-key data chunk; select and arrange the bit data of the sub-key data chunk to obtain a sub-key.

In Embodiment 10, the preset key written by the communication interruption unit in to the storing unit further includes a second key;

the decrypting unit specifically includes:

a creating sub-unit configured to create a sub-key according to the second key;

an arranging unit configured to rearrange the bit data of the data to be encrypted;

a dividing sub-unit configured to divide the rearranged data to be encrypted to obtain a fifth intermediate data chunk and a sixth intermediate chunk;

an iterating sub-unit configured to perform iteration on the fifth intermediate data chunk and the sixth intermediate data chunk, which are obtained by the dividing sub-unit, to obtain a seventh intermediate data chunk and a eighth intermediate data chunk; and a transposing sub-unit configured to connect the eighth intermediate data chunk and the seventh intermediate data chunk, which are obtained by the iterating sub-unit, and transpose the connected data, convert the transposing result according to number base conversion to obtain cipher text of data to be encrypted.

Further, the creating sub-unit is specifically configured to rearrange the bit data of the second key; divide the arranged second key to obtain a third key data chunk and a fourth data chunk; implement left circular shift on the third key data chunk to obtain a third sub-key data chunk; implement left circular shift on the fourth key data chunk to obtain a fourth sub-key data chunk corresponding to the third sub-key data chunk; connect the third sub-key data chunk and the fourth sub-key data chunk corresponding to the third sub-key data chunk to obtain a sub-key data chunk; select and arrange the bit data of the sub-key data chunk to obtain a sub-key.

Finally, it should be noted that the above embodiments are merely intended to explain, rather than to limit, various technical solutions of the present disclosure described above. Although the present disclosure has been explained in detail with reference to the foregoing embodiments, those skilled in the art should appreciate that modifications can still be made to the technical solutions recorded in the embodiments described hereinabove, or equivalent substitutions are still possible for part or all of the technical features therein, without causing the essence of the corresponding technical solution to deviate from the scope of various embodiment technical solutions of the present disclosure.

The invention claimed is:

1. A working method of a credit card, wherein the credit card is built in a micro-processor, and the method comprises the following steps:

S1) powering up the micro-processor and performing, by the micro-processor, system initializing;

S2) making, by the micro-processor, the micro-processor sleeping and waking the same up when the micro-processor detects a preset interruption; and S3) entering, by the micro-processor, a preset interruption processing process to perform an interruption processing, exiting the interruption processing process when the interruption processing is completed, then going back to Step S2;

the preset interruption processing comprises the following steps:

a1) obtaining a dynamic security code factor, generating bit torrent according to the dynamic security code factor and card personalized data in a card; and dividing the bit torrent into a first data chunk and a second data chunk;

a2) taking the first data chunk as data to be encrypted, and encrypting the data to be encrypted to obtain a first data chunk ciphertext;

a3) performing exclusive OR operation on the first data chunk ciphertext and a second data chunk to obtain a third data chunk;

a4) taking the third data chunk as data to be encrypted, and encrypting the data to be encrypted to obtain a third data chunk ciphertext;

a5) taking the third data chunk ciphertext as data to be decrypted, decrypting the data to be decrypted to obtain a fourth data chunk, taking the fourth data chunk as data to be encrypted, and encrypting the data to the encrypted to obtain a fourth data chunk ciphertext; and a6) extracting, converting and sorting the fourth data chunk ciphertext, taking a preset part of processing result as a current valid credit card security code, and displaying the current valid credit card security code.

2. The working method of the credit card of claim 1, wherein obtaining the dynamic security code factor specifically is: obtaining a current time factor according to counting time.

3. The working method of the credit card of claim 1, wherein the Step 2 further comprises: waking up the micro-processor when the micro-process detects a communication interruption and executing Step S5;

Step S5 specifically comprises: entering, by the micro-processor, the communication interruption processing process, executing the communication interruption processing, exiting the communication interruption processing process when the communication interruption processing is completed;

the communication interruption processing comprises: receiving, by the micro-processor, communication data, performing card personalizing according to the received communication data; and the preset interruption processing further comprises: Step a0) determining whether card personalizing is completed, if yes, executing Step a1; otherwise, the preset interruption processing is completed.

4. The working method of the credit card of claim 1, wherein dividing the bit torrent specifically is dividing the bit torrent evenly.

5. The working method of the credit card of claim 1, wherein extracting, converting and sorting the fourth data chunk ciphertext specifically comprises: extracting all numbers between the first data and the second data in the fourth data chunk ciphertext from the beginning of the left side of the fourth data chunk ciphertext to obtain a first extracting data; extracting all numbers between the third data and the fourth data in the fourth data chunk ciphertext from the beginning of the left side of the fourth data chunk ciphertext to obtain a second extracting data; replacing each number in the second extracting data with its corresponding difference between the number and a fifth data to obtain a converted second extracting data; connecting the first extracting data and the converted second extracting data orderly to obtain a processing result.

6. A working method of a credit card, wherein the credit card is built in a micro-processor and the method comprises the following steps:

s1) powering up the micro-processor and performing, by the micro-processor, system initializing;

s2) determining, by the micro-processor, whether a preset interruption flag is set, if yes, resetting the preset interruption flag and executing the preset interrupt processing; otherwise, executing Step s3; and s3) sleeping of the micro-processor, waking the same up when the micro-processor detects a preset interruption, entering the preset interruption processing process and resetting the preset interruption flag, exiting the preset interruption processing process, then going back to Step s2;

the preset interruption processing comprises the following steps:

s2-1) obtaining a dynamic security code factor, generating bit torrent according to the dynamic security code factor and card personalized data in a card; and dividing the bit torrent into a first data chunk and a second data chunk;

s2-2) taking the first data chunk as data to be encrypted, encrypting the data to be encrypted to obtain a first data chunk ciphertext;

s2-3) performing exclusive OR operation on the first data chunk ciphertext and a second data chunk to obtain a third data chunk;

s2-4) taking the third data chunk as data to be encrypted, encrypting the data to be encrypted to obtain a third data chunk ciphertext;

s2-5) taking the third data chunk ciphertext as data to be decrypted, decrypting the data to be decrypted to obtain a fourth data chunk, then taking the fourth data chunk as data to be encrypted, encrypting the data to the encrypted to obtain a fourth data chunk ciphertext; and s2-6) extracting, converting and sorting the fourth data chunk ciphertext, taking a preset part of processing result as a current valid credit card security code and displaying the current valid credit card security code.

7. The working method of the credit card of claim 6, wherein obtaining the dynamic security code factor specifically is: obtaining a current time factor according to the counting time.

8. The working method of the credit card of claim 6, wherein Step s2 further comprises: checking, by the micro-processor, whether the communicating interrupt flag is set, resetting the communicating interrupt flag when the communicating interrupt flag is set and performing communication interruption processing, otherwise, executing Step s3;

the communication interruption processing comprises: receiving, by the micro-processor, communication data, performing card personalizing according to the received communication data;

the preset interruption processing further comprises: Step s2-0) determining whether the card personalizing is completed, if yes, executing Step s2-1; otherwise, the preset interruption processing is completed;

Step s3 further comprises: waking up the micro-processor upon detecting the communication interruption, entering the communication interruption processing process and setting the communication interruption flag, exiting the communication interruption processing process, then going back to Step s2.

9. The working method of the credit card of claim 6, wherein dividing the bit torrent specifically is dividing the bit torrent evenly.

10. The working method of the credit card of claim 6, wherein extracting, converting and sorting the fourth data chunk ciphertext specifically comprises: extracting all numbers between the first data and the second data in the fourth data chunk ciphertext from the beginning of the left side of the fourth data chunk ciphertext to obtain a first extracting data; extracting all numbers between the third data and the fourth data in the fourth data chunk ciphertext from the beginning of the left side of the fourth data chunk ciphertext to obtain a second extracting data; replacing each number in the second extracting data with its corresponding difference between the number and a fifth data to obtain a converted second extracting data; connecting the first extracting data and the converted second extracting data orderly to obtain a processing result.

11. A credit card, wherein the credit card is built in a micro-processor and the micro-processor comprises: a powering up module configured to power up the micro-processor; an initializing module configured to perform system initializing after the micro-processor is powered up; a sleeping module configured for the micro-processor to sleep after initializing; and to sleep after the micro-processor exits the present interruption processing process; a detecting module configured to detect a preset interruption when the micro-processor sleeps; a waking up module configured for the micro-processor to be waken up after detecting the preset interruption; an interruption processing module configured for the micro-processor to enter a preset interruption processing process after being waken up and perform preset interruption processing; and exit the preset interruption processing process when the preset interruption processing is completed, the interruption processing module specifically comprises: an obtaining unit configured to obtain a dynamic security code factor; a storing unit configured to store card personalized data; a generating unit configured to generate bit torrent according to the dynamic security code factor obtained by the obtaining unit and card personalized data stored in the storing unit; a dividing unit configured to divide the bit torrent generated by the generating unit into a first data chunk and a second data chunk; an encrypting unit configured to take the first data chunk as data to be encrypted, encrypting the data to be encrypted to obtain a first data chunk ciphertext; take the third data chunk obtained by the exclusive OR, operation performing unit as data to be encrypted, encrypting the data to be encrypted to obtain a third data chunk ciphertext; and take the fourth data chunk obtained by the decrypting unit as data to be encrypted, encrypting the data to the encrypted to obtain a fourth data chunk ciphertext; an exclusive OR operation performing unit configured to perform exclusive OR operation on the first data chunk ciphertext obtained by the encrypting unit and a second data chunk obtained by the dividing unit to obtain a third data chunk; a decrypting unit configured to take the third data chunk ciphertext obtained by the encrypting unit as data to be decrypted, decrypt the data to be decrypted to obtain a fourth data chunk; a processing unit configured to extract, convert and sort the fourth data chunk ciphertext obtained by the encrypting unit, and take a preset part of processing result as a current valid credit card security code; and a displaying unit configured to control and display the current valid credit card security code; where all the modules are units are implemented as a hardware circuit.

12. The credit card of claim 11, wherein the obtaining unit specifically is configured to obtain a current time factor according to counting time when determining unit determines that updating credit card security code is required.

13. The credit card of claim 11, wherein the detecting module specifically is configured to detect communication interruption when the micro-processor sleeps;

the waking up module is specifically configured for the micro-processor to be waken up after detecting the communication interruption the interruption processing module is specifically configured to enter the communication interruption processing process and executes the communication interruption processing after the micro-processor is waken up; and exit the communication interruption processing process when the communication interruption processing is completed;

the interruption processing module further includes a communication interruption processing unit and a determining unit;

the communication interruption processing unit is configured to receive communication data and perform card personalizing according to the received communication data;

the determining unit is configured to determine whether card personalizing is completed; and the obtaining unit is specifically configured to obtain a dynamic security factor when the detecting unit determines that the card personalizing is completed.

14. The credit card of claim 11, wherein the dividing unit is specifically configured to evenly divide the bit torrent, which is obtained by the generating unit, into a first data chunk and a second data chunk.

15. The credit card of claim 11, wherein the processing unit is specifically configured to extract all numbers between the first data and the second data in the fourth data chunk ciphertext from the beginning of the left side of the fourth data chunk ciphertext, which obtained by the encrypting unit, to obtain a first extracting data; extract all numbers between the third data and the fourth data in the fourth data chunk ciphertext from the beginning of the left side of the fourth data chunk ciphertext to obtain a second extracting data; replace each number in the second extracting data with its corresponding difference between the number and a fifth data to obtain a converted second extracting data; and connect the first extracting data and the converted second extracting data orderly to obtain a processing result.

16. A credit card, wherein the credit card is built in a micro-processor and the micro-processor comprises: a powering up module configured for the micro-processor to power up; an initializing module configured to perform system initializing after the micro-processor powers up; a checking module configured to check whether a preset interrupt flag is set after the micro-processor performs system initializing; and check whether the preset interrupt flag is set after the micro-processor exits interruption processing process; an interruption processing module configured to reset preset interruption flag upon detecting that the preset interruption flag is set and perform preset interruption processing; a sleeping module configured to sleep when the micro-processor checks that no interruption flag is set; a detecting module is configured to detect preset interruption when the microprocessor sleeps; and a waking up module configured to enter a preset interruption processing process and set a preset interruption flag when the micro-processor is waken up upon detecting the preset interruption, and exit the preset interruption processing process; the interruption processing module specifically comprises: an obtaining unit configured to obtain a dynamic security code factor; a storing unit configured to store card personalized data; a generating unit configured to generate bit torrent according to the dynamic security code factor obtained by the obtaining unit and card personalized data in the storing unit; a dividing unit configured to divide the bit torrent generated by the generating unit into a first data chunk and a second data chunk: an encrypting unit configured to take the first data chunk as data to be encrypted, encrypting the data to be encrypted to obtain a first data chunk ciphertext; take the third data chunk obtained by the exclusive OR operation performing unit as data to be encrypted, encrypting the data to be encrypted to obtain a third data chunk ciphertext; and take the fourth data chunk obtained by the decrypting unit as data to be encrypted, encrypting the data to the encrypted to obtain a fourth data chunk ciphertext; an exclusive OR operation performing unit configured to perform exclusive OR operation on the first data chunk ciphertext obtained by the encrypting unit and a second data chunk obtained by the dividing unit to obtain a third data chunk; a decrypting unit configured to take the third data chunk ciphertext obtained by the encrypting unit as data to be decrypted, decrypt the data to be decrypted to obtain a fourth data chunk; a processing unit configured to extract, convert and sort the fourth data chunk ciphertext obtained by the encrypting unit, and take a preset part of processing result as a current valid credit card security code; and a displaying unit configured to control and display the current valid credit card security code; where all the modules are units are implemented as a hardware circuit.

17. The credit card of claim 16, wherein the obtaining unit is specifically configured to obtain a current time factor according to counting time when the determining unit determines that the credit card security code requires to be updated.

18. The credit card of claim 16, wherein the checking module is specifically configured to check whether a RTC interruption flag is set after the micro-processor performs system initializing; and check whether the communication interruption flag is set after the micro-processor exits the interruption processing process; and the interruption processing module is specifically configured to reset the communication interruption flag when the micro-processor checks and finds that the communication interruption flag is set and execute key the interruption processing;

the interruption processing module further comprises a communication interruption processing unit and a determining unit;

the communication interruption processing unit is configured to receive communication data and perform card personalizing according to the received communication data;

the determining unit is configured to determine whether the card personalizing is completed;

the obtaining unit is specifically configured to obtain the dynamic security factor when the determining unit determines that card personalizing is completed;

the detecting module is further configured to detect the preset interruption when the micro-processor sleeps; and the waking up module is further configured to enter a preset interruption processing process to set a preset interruption flag when the micro-processor is waken up upon detecting the preset interruption, then exit the preset interruption processing process.

19. The credit card of claim 16, wherein the dividing unit is specifically configured to evenly divide the bit torrent, which is obtained by the generating unit, into a first data chunk and a second data chunk.

20. The credit card of claim 16, wherein the processing unit is specifically configured to extract all numbers between the first data and the second data in the fourth data chunk ciphertext from the beginning of the left side of the fourth data chunk ciphertext, which obtained by the encrypting unit, to obtain a first extracting data; extract all numbers between the third data and the fourth data in the fourth data chunk ciphertext from the beginning of the left side of the fourth data chunk ciphertext to obtain a second extracting data; replace each number in the second extracting data with its corresponding difference between the number and a fifth data to obtain a converted second extracting data; and connect the first extracting data and the converted second extracting data orderly to obtain a processing result.

* * * * *